US012284324B2

(12) United States Patent
Chen et al.

(10) Patent No.: US 12,284,324 B2
(45) Date of Patent: Apr. 22, 2025

(54) AUGMENTED REALITY PROP INTERACTIONS

(71) Applicant: Snap Inc., Santa Monica, CA (US)

(72) Inventors: Tianying Chen, Pittsburgh, PA (US); Timothy Chong, Kirkland, WA (US); Sven Kratz, Mercer Island, WA (US); Fannie Liu, New York, NY (US); Andrés Monroy-Hernández, Seattle, WA (US); Olivia Seow, Cambridge, MA (US); Yu Jiang Tham, Seattle, WA (US); Rajan Vaish, Beverly Hills, CA (US); Lei Zhang, Ann Arbor, MI (US)

(73) Assignee: Snap Inc., Santa Monica, CA (US)

( * ) Notice: Subject to any disclaimer, the term of this patent is extended or adjusted under 35 U.S.C. 154(b) by 14 days.

(21) Appl. No.: 17/888,948

(22) Filed: Aug. 16, 2022

(65) Prior Publication Data

US 2023/0066686 A1 Mar. 2, 2023

Related U.S. Application Data

(60) Provisional application No. 63/240,049, filed on Sep. 2, 2021.

(51) Int. Cl.
*H04N 13/111* (2018.01)
*G06T 3/60* (2006.01)
(Continued)

(52) U.S. Cl.
CPC .............. *H04N 13/111* (2018.05); *G06T 3/60* (2013.01); *G06V 10/457* (2022.01);
(Continued)

(58) Field of Classification Search
CPC .... H04N 13/111; G06V 20/20; G06V 10/457; G06V 10/764; G06T 3/60; G06T 2200/24
(Continued)

(56) References Cited

U.S. PATENT DOCUMENTS 10,139,899 B1 11/2018 Niemeyer et al.
10,306,315 B2 5/2019 Bailey et al.
(Continued)

FOREIGN PATENT DOCUMENTS

CN 103139394 A 6/2013
CN 103974190 A 8/2014
(Continued)

OTHER PUBLICATIONS

Burgess Colin J. et al.: "Can genetic programming improve software effort estimation? A comparative evaluation", Information and Software Technology, vol. 43, No. 14, Dec. 1, 2001 (Dec. 1, 2001), pp. 863-873.
(Continued)

*Primary Examiner* — Jin Ge
(74) *Attorney, Agent, or Firm* — CM Law; Stephen J. Weed

(57) ABSTRACT

Augmented reality (AR) systems, devices, media, and methods are described for generating AR experiences including interactions with virtual or physical prop objects. The AR experiences are generated by capturing images of a scene with a camera system, identifying an object receiving surface and corresponding surface coordinates within the scene, identifying an AR primary object and a prop object (physical or virtual), establishing a logical connection between the AR primary object and the prop object, generating AR overlays including actions associated with the AR primary object responsive to commands received via a user input system that position the AR primary object adjacent the object receiving surface responsive to the primary object coordinates and the surface coordinates within the scene and that position the AR primary object and the prop object with respect to one another in accordance with the logical con-
(Continued)

nection, and presenting the generated AR overlays with a display system.

12 Claims, 18 Drawing Sheets

(51) Int. Cl.
*G06V 10/44* (2022.01)
*G06V 10/764* (2022.01)
*G06V 20/20* (2022.01)

(52) U.S. Cl.
CPC ............ *G06V 10/764* (2022.01); *G06V 20/20* (2022.01); *G06T 2200/24* (2013.01)

(58) Field of Classification Search
USPC ........................................................ 345/419
See application file for complete search history.

(56) References Cited

U.S. PATENT DOCUMENTS

| | | | |
|---|---|---|---|
| 11,003,308 | B1 | 5/2021 | Dryer et al. |
| 2011/0310227 | A1 | 12/2011 | Konertz et al. |
| 2012/0023534 | A1 | 1/2012 | Dasilva et al. |
| 2012/0249443 | A1 | 10/2012 | Anderson et al. |
| 2012/0249591 | A1 | 10/2012 | Maciocci et al. |
| 2012/0293407 | A1 | 11/2012 | Lee |
| 2013/0044128 | A1 | 2/2013 | Liu et al. |
| 2013/0117377 | A1 | 5/2013 | Miller |
| 2013/0293584 | A1 | 11/2013 | Anderson |
| 2018/0129276 | A1 | 5/2018 | Nguyen et al. |
| 2018/0157398 | A1 | 6/2018 | Kaehler et al. |
| 2018/0322706 | A1* | 11/2018 | Drouin .................... G06F 3/011 |
| 2019/0347854 | A1 | 11/2019 | Karlov et al. |
| 2020/0117268 | A1 | 4/2020 | Kritzler et al. |
| 2020/0160607 | A1 | 5/2020 | Kjallstrom et al. |
| 2020/0342683 | A1* | 10/2020 | Panec ................... A63F 13/327 |
| 2020/0357184 | A1 | 11/2020 | Paul et al. |
| 2020/0363929 | A1 | 11/2020 | Srinivasan et al. |
| 2020/0387289 | A1* | 12/2020 | Dunn .................... G06F 3/0484 |
| 2021/0082084 | A1* | 3/2021 | Baldus ................. G06F 3/04815 |
| 2021/0132781 | A1 | 5/2021 | Daniels et al. |
| 2021/0178278 | A1 | 6/2021 | Qiu et al. |
| 2021/0405761 | A1* | 12/2021 | Canberk ............ G02B 27/0172 |
| 2022/0005254 | A1* | 1/2022 | Gladkov .................. G06F 3/013 |
| 2022/0157026 | A1 | 5/2022 | Bennett et al. |
| 2022/0301245 | A1 | 9/2022 | Shuvi |
| 2022/0335697 | A1* | 10/2022 | Harding ................ G06T 19/006 |
| 2022/0351475 | A1* | 11/2022 | Ben-Dor ............ G06K 7/10881 |

FOREIGN PATENT DOCUMENTS

| | | |
|---|---|---|
| CN | 109728918 A | 5/2019 |
| CN | 111450538 A | 7/2020 |
| EP | 3462294 A1 | 4/2019 |
| WO | 2018227098 A1 | 12/2018 |

OTHER PUBLICATIONS

Gullichsen, Frida: "Augmented audio—the importance of sound in AR", Jun. 12, 2019 (Jun. 12, 2019), XP093003111, Retrieved from the Internet: URL:https://blog.arilyn.com/augmented-audio [retrieved on Nov. 29, 2022], 8 pages.

International Search Report and Written Opinion for International Application No. PCT/US2022/040305, dated Dec. 19, 2022 (Dec. 19, 2022)—14 pages.

International Search Report and Written Opinion for International Application No. PCT/US2022/040314, dated Nov. 28, 2022 (Nov. 28, 2022)—12 pages.

International Search Report and Written Opinion for International Application No. PCT/US2022/040398, dated Dec. 21, 2022 (Dec. 21, 2022)—12 pages.

International Search Report and Written Opinion for International Application No. PCT/US2022/040443, dated Nov. 25, 2022 (Nov. 25, 2022)—11 pages.

Langlotz, Tobias et al: "Sketching up the world: In situ authoring for mobile Augmented Reality", Personal and Ubiquitous Computing, Springer Verlag, London, GB, vol. 16, No. 6, Aug. 1, 2012 (Aug. 1, 2012), pp. 623-630.

Wang Ming-Jen et al.: "An Easy to Use Augmented Reality Authoring Tool for Use in Examination Purpose" in: "International Conference on Intelligent Information Processing", Jan. 1, 2010 (Jan. 1, 2010), Springer New York LLC, US, vol. 332, pp. 285-288.

* cited by examiner

940 ⇥

942 — Receive action selection

944 — Optionally, identify prop (AR object/physical object)

946 — Adjust AR primary object responsive to action selection and optional prop

952 — Receive audio personalization selection

954 — Present audio options

956 — Live Record ? — Yes → 958 — Record live audio as soundtrack

No ↓

960 — Present prerecorded soundtracks

962 — Receive soundtrack selection

964 — Optionally receive soundtrack adjustments

966 — Include soundtrack in handcrafted AR file

FIG. 9D

AUGMENTED REALITY PROP INTERACTIONS

CROSS-REFERENCE TO RELATED APPLICATIONS

This application claims priority to U.S. Provisional Application No. 63/240,049 filed on Sep. 2, 2021, the contents of which are incorporated fully herein by reference.

TECHNICAL FIELD

Examples set forth in the present disclosure relate to the field of augmented reality (AR) devices, including mobile devices and wearable devices such as eyewear. More particularly, but not by way of limitation, the present disclosure describes generating AR experiences using AR props, physical props, or a combination thereof.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems, and displays. Graphical user interfaces allow the user to interact with displayed content, including virtual objects and graphical elements such as icons, taskbars, list boxes, menus, buttons, and selection control elements like cursors, pointers, handles, and sliders.

Virtual reality (VR) technology generates a complete virtual environment including realistic images, sometimes presented on a VR headset or other head-mounted display. VR experiences allow a user to move through the virtual environment and interact with virtual objects. AR is a type of VR technology that combines real objects in a physical environment with virtual objects and displays the combination to a user. The combined display gives the impression that the virtual objects are authentically present in the environment.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIGS. 9A, 9B, 9C, and 9D are flow charts for example steps for generating and sharing AR experiences.

DETAILED DESCRIPTION

Figure 1A:
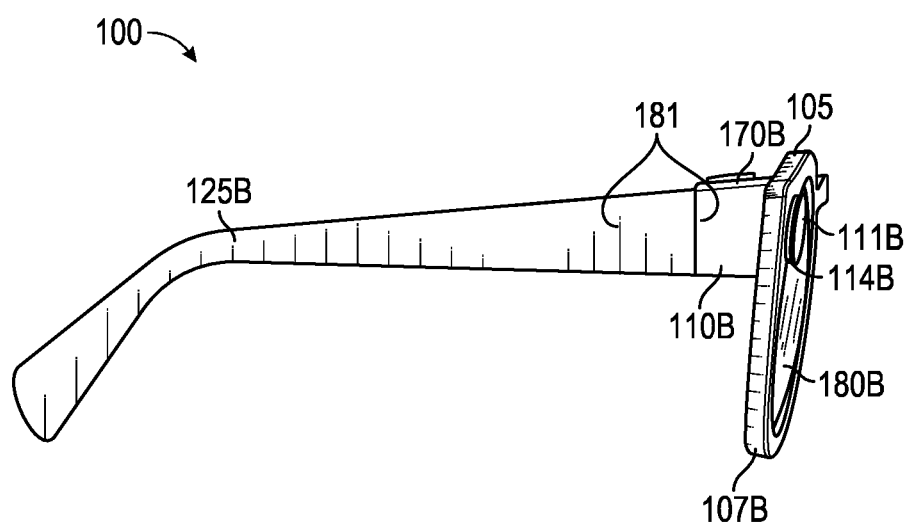
FIG. 1A is a side view (right) of an example hardware configuration of an eyewear device suitable for use in an AR system.

The disclosure includes examples for generating AR experiences including interactions between an AR primary object and physical or virtual prop (secondary) objects. Example systems and methods allows users to use a primary AR content (such as an AR bear) and interact with secondary content prop objects (such as an AR drum/AR bear or a real world object such as a mug) to create enhanced (storytelling) experiences. In example AR prop scenarios: by using another AR bear as a prop object, a user can make an AR primary object bear hug or do a couple dance; by using an AR drum as a prop object, the AR primary object bear can play drums; and by using a 3D AR drawing as a prop object, a user can draw rings around the AR primary object bear that move when the bear moves. In an example physical prop scenario: by using real world objects (e.g., a mug) as a prop, a user can make the AR primary object bear, for example, come out of the mug or swim in the water inside the mug.

Overall, through prop-based AR, users can create compelling storytelling experiences or routines with any primary AR content.

In some examples, augmented reality (AR) systems, devices, media, and methods are described for generating AR experiences including interactions with virtual or physical prop objects. The AR experiences are generated by capturing images of a scene with a camera system, identifying an object receiving surface and corresponding surface coordinates within the scene, identifying an AR primary object and a prop object (physical or virtual), establishing a logical connection between the AR primary object and the prop object, generating AR overlays including actions associated with the AR primary object responsive to commands received via a user input system that position the AR primary object adjacent the object receiving surface responsive to the primary object coordinates and the surface coordinates within the scene and that position the AR primary object and the prop object with respect to one another in accordance with the logical connection, and presenting the generated AR overlays with a display system.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components, and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Advanced AR technologies, such as computer vision and object tracking, may be used to produce a perceptually enriched and immersive experience. Computer vision algorithms extract three-dimensional data about the physical world from the data captured in digital images or video. Object recognition and tracking algorithms are used to detect an object in a digital image or video, estimate its orientation or pose, and track its movement over time.

The term "pose" refers to the static position and orientation of an object at a particular instant in time. The term "gesture" refers to the active movement of an object, such as a hand, through a series of poses, sometimes to convey a signal or idea. The terms, pose and gesture, are sometimes used interchangeably in the field of computer vision and AR. As used herein, the terms "pose" or "gesture" (or variations thereof) are intended to be inclusive of both poses and gestures; in other words, the use of one term does not exclude the other.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
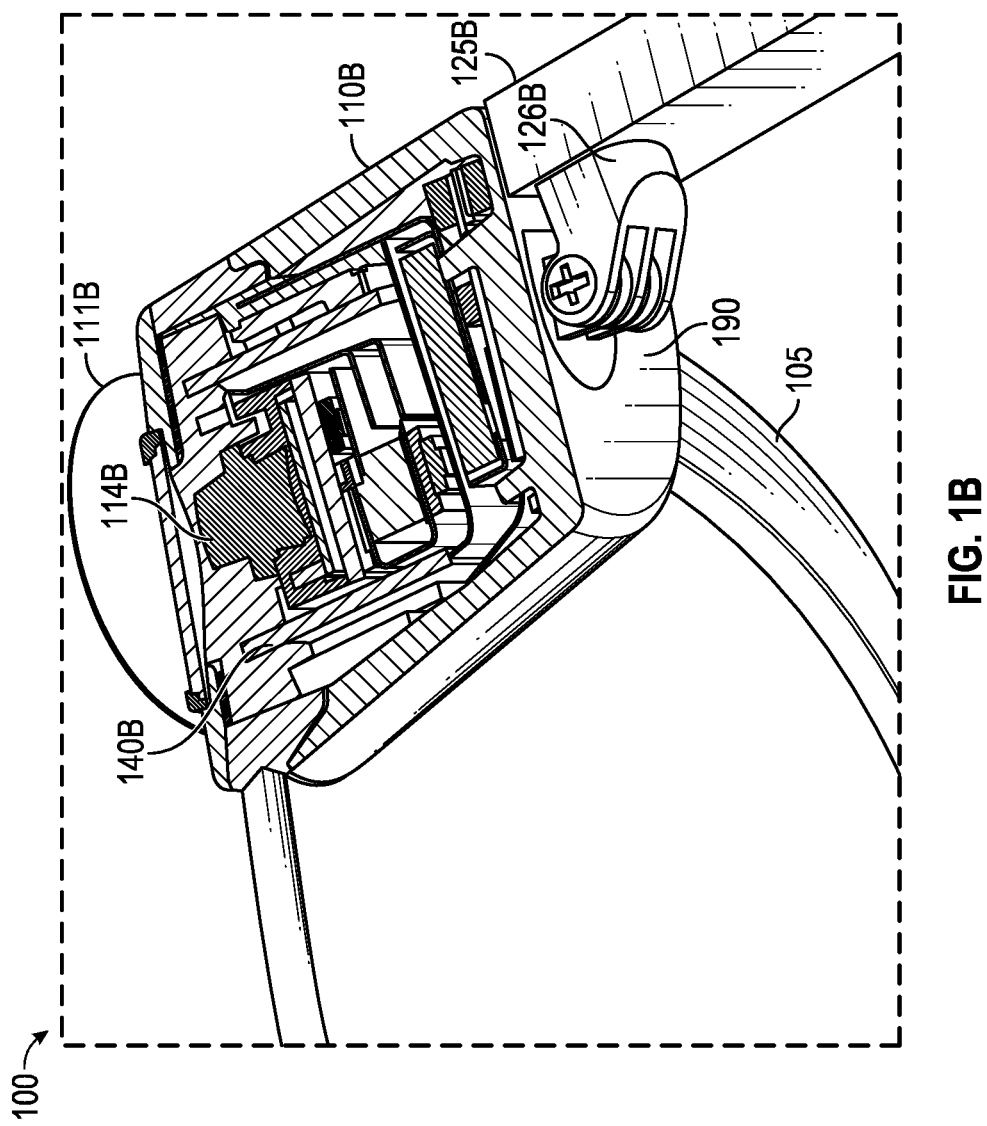
FIG. 1B is a perspective, partly sectional view of a right corner of the eyewear device of FIG. 1A depicting a right visible-light camera, and a circuit board.
Figure 1C:
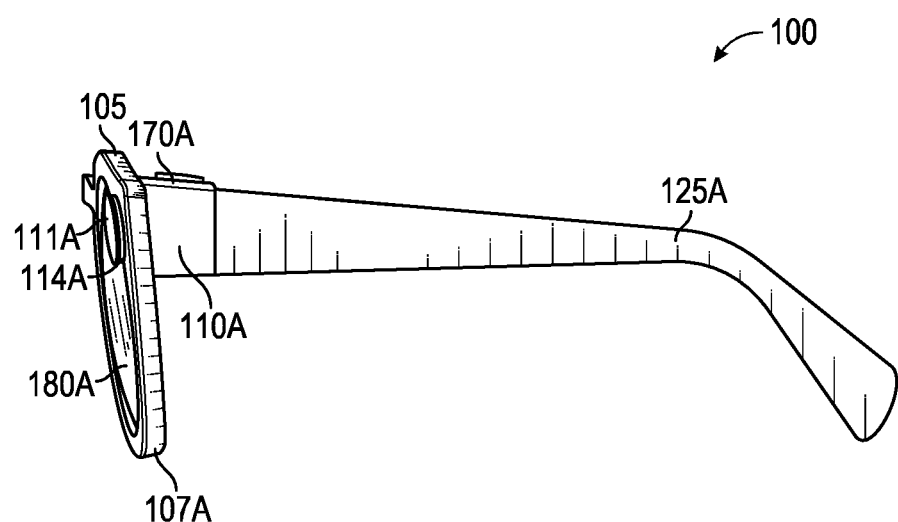
FIG. 1C is a side view (left) of an example hardware configuration of the eyewear device of FIG. 1A, which shows a left visible-light camera.
Figure 1D:
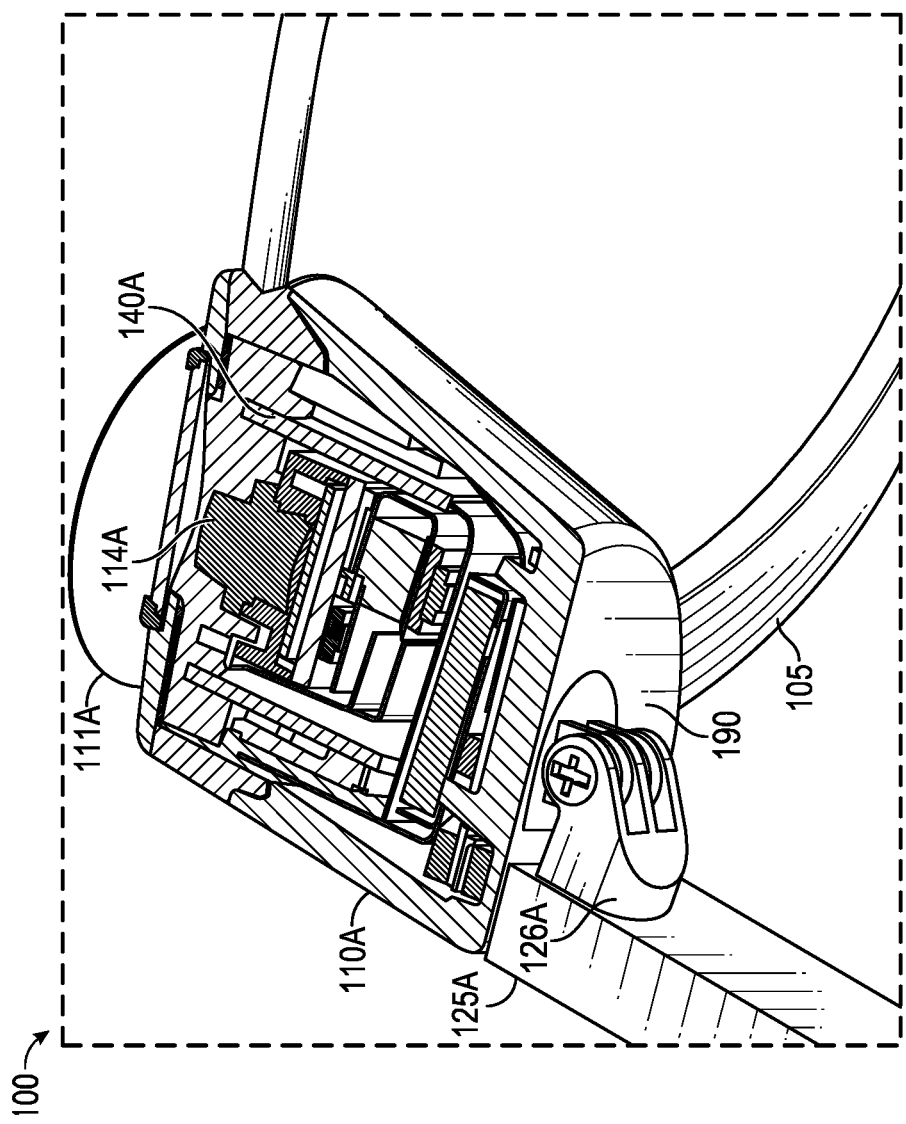
FIG. 1D is a perspective, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
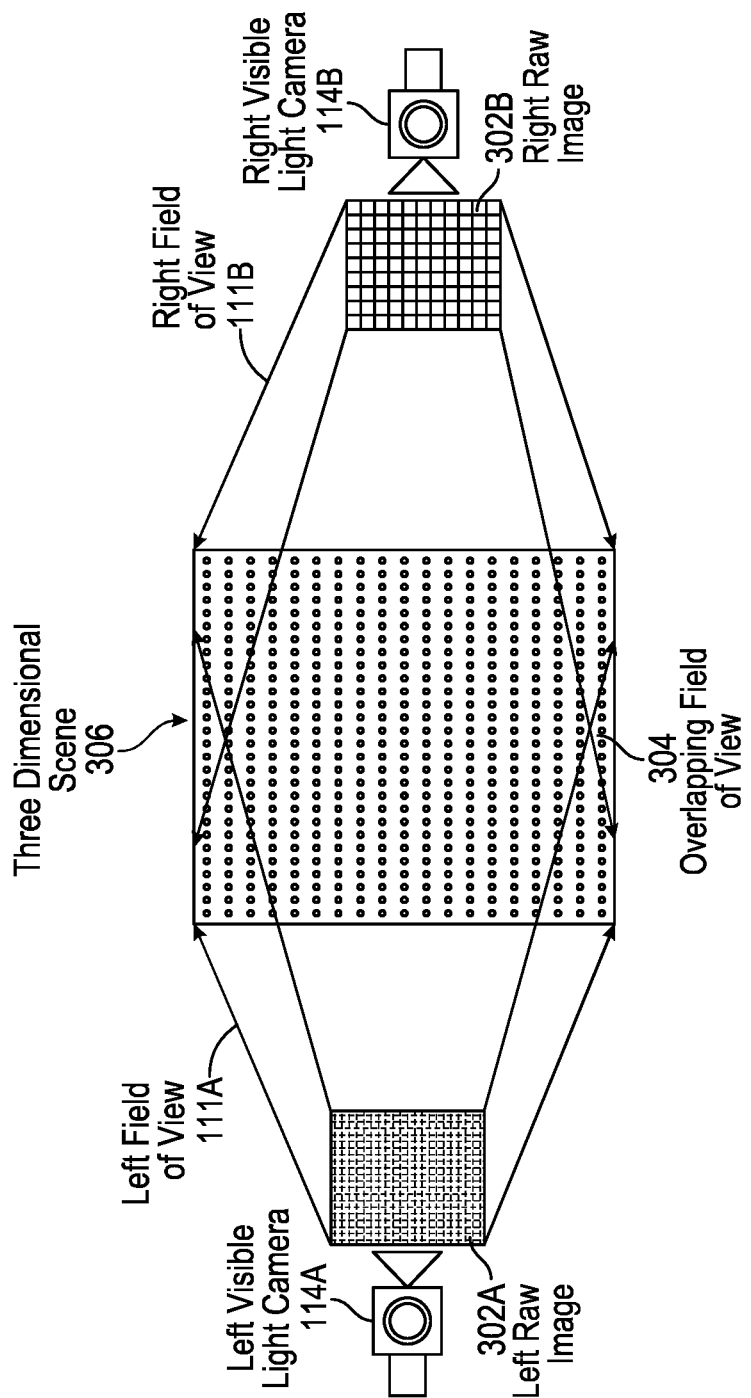
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example configuration, one or both visible-light cameras 114A, 114B has a field of view of 100° and a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 480p (e.g., 640×480 pixels), 720p, 1080p, or greater. Other examples include visible-light cameras 114A, 114B that can capture high-definition (HD) video at a high frame rate (e.g., thirty to sixty frames per second, or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). A right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B. A left hinge 126B connects the left corner 110A to a left temple 125A of the eyewear device 100. In some examples, components of the left visible-light camera 114A, the flexible PCB 140A, or other electrical connectors or contacts may be located on the left temple 125A or the left hinge 126A.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via Wi-Fi).

Figure 2A:
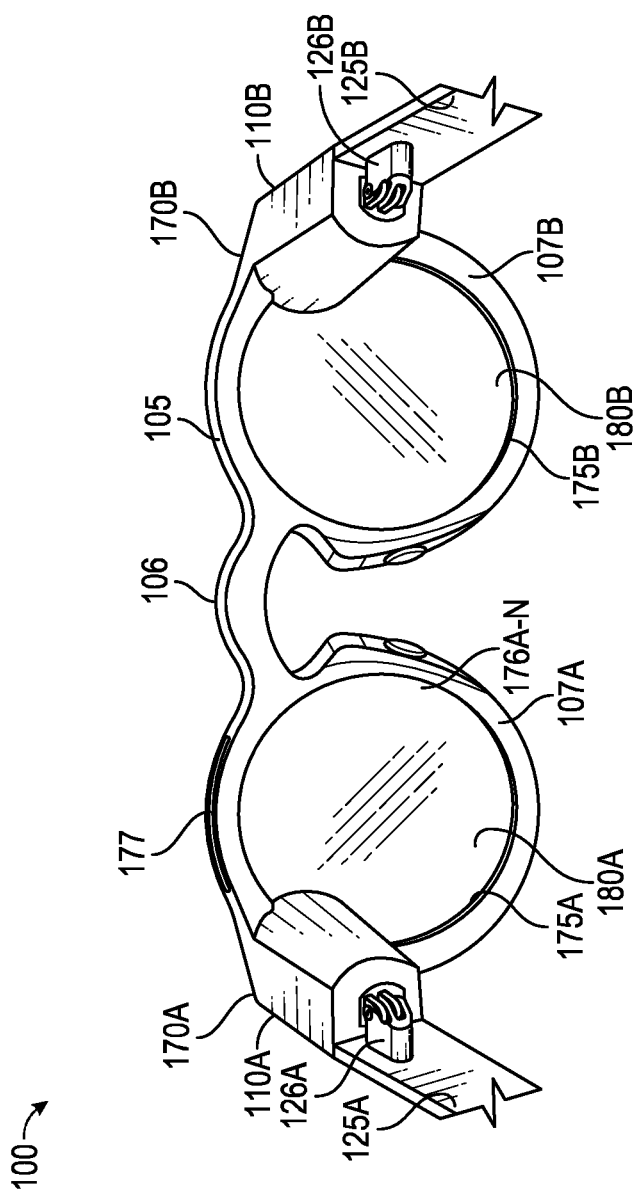
FIGS. 2A and 2B are rear views of example hardware configurations of an eyewear device utilized in the AR system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
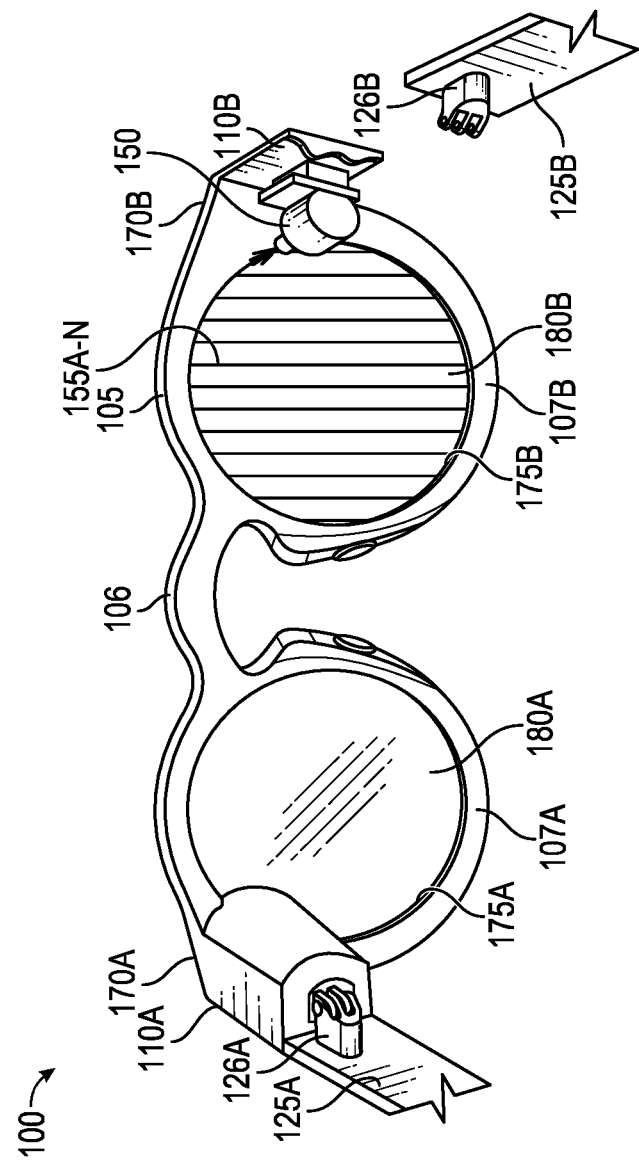

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge or diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector (not shown) and a right projector 150. The left optical assembly 180A may include a left display matrix 177 or a left set of optical strips (not shown) which are configured to interact with light from the left projector. Similarly, the right optical assembly 180B may include a right display matrix (not shown) or a right set of optical strips 155A, 155B, ... 155N which are configured to interact with light from the right projector 150. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen. Likewise, cameras 570 of mobile device 401 (FIG. 5) may be used to capture images of a real scene 306 for processing (e.g., by CPU 530) to generate depth images.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the AR system 400 (FIG. 4) includes the eyewear device 100, which includes a frame 105 and a left temple 125A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 125A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

Figure 4:
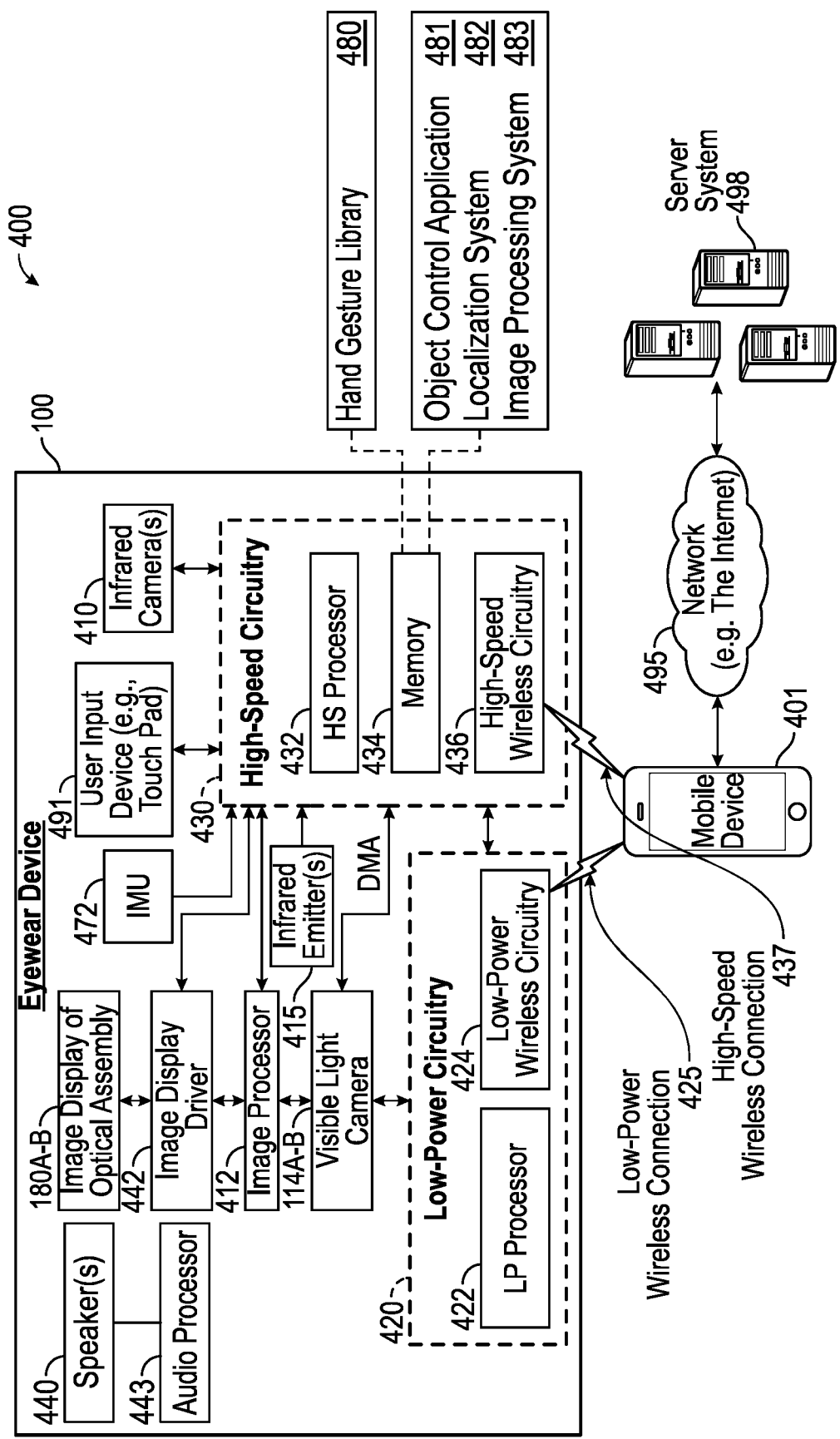
FIG. 4 is a functional block diagram of an example AR system including a wearable device (e.g., an eyewear device) and a server system connected via various networks.

FIG. 4 is a functional block diagram of an example AR system 400 that includes a wearable device (e.g., an eyewear device 100), a mobile device 401, and a server system 498 connected via various networks 495 such as the Internet. As shown, the AR system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The eyewear device 100 additionally includes one or more speakers 440 (e.g., one associated with the left side of the eyewear device and another associated with the right side of the eyewear device). The speakers 440 may be incorporated into the frame 105, temples 125, or corners 110 of the eyewear device 100. The one or more speakers 440 are driven by audio processor 443 under control of low-power circuitry 420, high-speed circuitry 430, or both. The speakers 440 are for presenting audio signals including, for example, a beat track. The audio processor 443 is coupled to the speakers 440 in order to control the presentation of sound.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
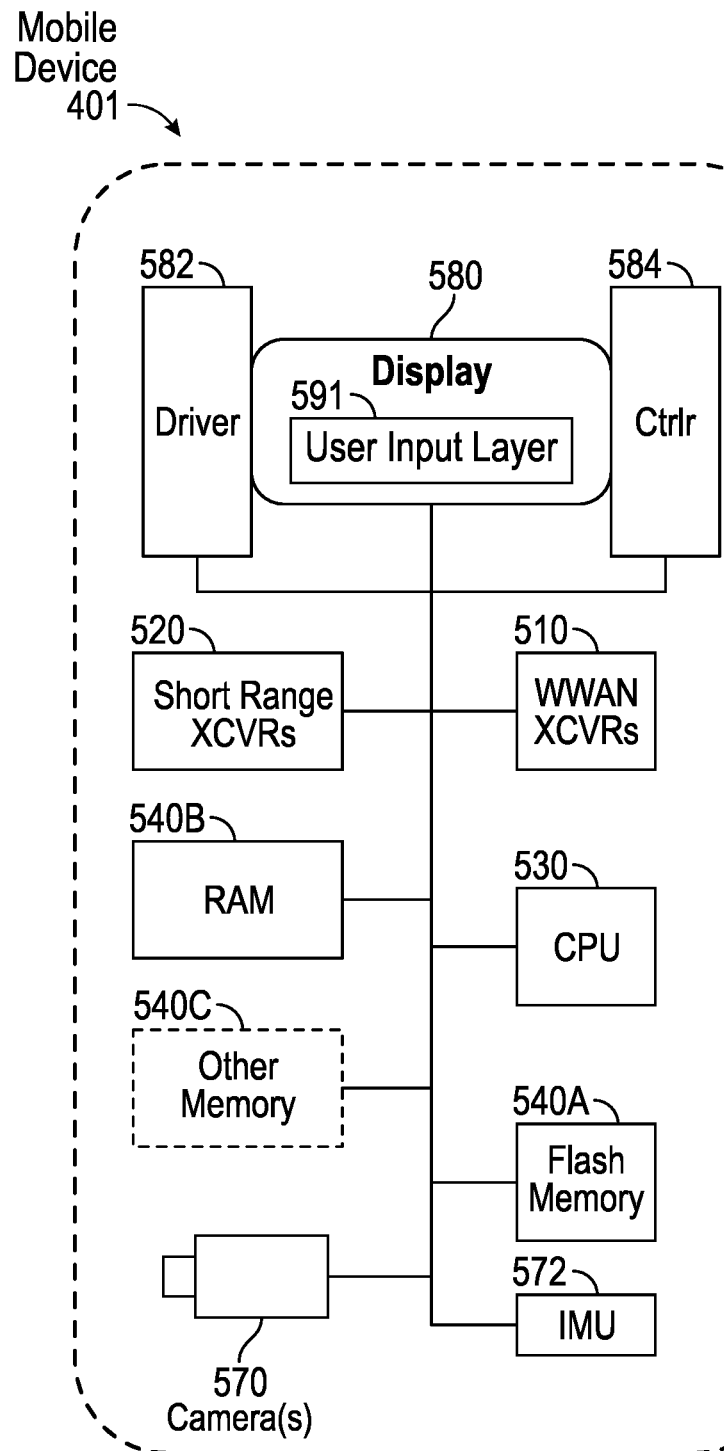
FIG. 5 is a diagrammatic representation of an example hardware configuration for a mobile device of the AR system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The AR system 400, as shown in FIG. 4, includes a computing device, such as mobile device 401, coupled to an eyewear device 100 over a network. The AR system 400 includes a memory for storing instructions and a processor for executing the instructions. Execution of the instructions of the AR system 400 by the processor 432 configures the eyewear device 100 to cooperate with the mobile device 401. The AR system 400 may utilize the memory 434 of the eyewear device 100 or the memory elements 540A, 540B, 540C of the mobile device 401 (FIG. 5). Also, the AR system 400 may utilize the processor elements 432, 422 of the eyewear device 100 or the central processing unit (CPU) 530 of the mobile device 401 (FIG. 5). In addition, the AR system 400 may further utilize the memory and processor elements of the server system 498. In this aspect, the memory and processing functions of the AR system 400 can be shared or distributed across the processors and memories of the eyewear device 100, the mobile device 401, and the server system 498.

The memory 434, in some example implementations, includes or is coupled to a hand gesture library 480. The library of hand gestures 480 includes a large number of poses and gestures, with the hand in various positions and orientations. The stored poses and gestures are suitable for ready comparison to a hand shape that is detected in an image. The library 480 includes three-dimensional coordinates for a large number of landmarks, from the wrist to the fingertips. For example, a hand gesture record stored in the library 480 may include a hand gesture identifier (e.g., pointing finger, thumb and finger making an L-shape, closed fist, open palm, relaxed hand, grasping an object, pinching, spreading), a point of view or a directional reference (e.g., palmar side visible, dorsal, lateral), and other information about orientation, along with three-dimensional coordinates for the wrist, the fifteen interphalangeal joints, the five fingertips and other skeletal or soft-tissue landmarks. The process of detecting a hand shape, in some implementations, involves comparing the pixel-level data in one or more captured frames of video data to the hand gestures stored in the library 480 until a good match is found.

The memory 434 additionally includes, in some example implementations, an object control application 481, a localization system 482, and an image processing system 483. In an AR system 400 in which a camera is capturing frames of video data, the object control application 481 configures the processor 432 to control the movement of an AR object 608 on a display in response to detecting one or more hand shapes or gestures via a camera system or on a user input layer of a display, for example. The localization system 482 configures the processor 432 to obtain localization data for use in determining the position of the eyewear device 100 relative to the physical environment. The localization data may be derived from a series of images, an IMU unit 472, a GPS unit, or a combination thereof. The image processing system 483 configures the processor 432 to present a captured still image on a display of an optical assembly 180A, 180B in cooperation with the image display driver 442 and the image processor 412.

FIG. 5 is a high-level functional block diagram of an example mobile device 401. Mobile device 401 includes a flash memory 540A which stores programming to be executed by the CPU 530 to perform all or a subset of the functions described herein. The mobile device 401 may include one or more speakers. The one or more speakers are driven by audio processor under control of the CPU 530. The speakers are for presenting audio signals including, for example, a beat track. The audio processor is coupled to the speakers in order to control the presentation of sound.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 891 for receiving input (by touch, multi-touch, or gesture, and the like, by hand, stylus, or other tool) and an image display 580 for displaying content.

As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The client device 401 in some examples includes a collection of motion-sensing components referred to as an inertial measurement unit (IMU) 572 for sensing the position, orientation, and motion of the client device 401. The motion-sensing components may be micro-electro-mechanical systems (MEMS) with microscopic moving parts, often small enough to be part of a microchip. The inertial measurement unit (IMU) 572 in some example configurations includes an accelerometer, a gyroscope, and a magnetometer. The accelerometer senses the linear acceleration of the client device 401 (including the acceleration due to gravity) relative to three orthogonal axes (x, y, z). The gyroscope senses the angular velocity of the client device 401 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the client device 401 relative to magnetic north.

The IMU 572 may include or cooperate with a digital motion processor or programming that gathers the raw data from the components and compute a number of useful values about the position, orientation, and motion of the client device 401. For example, the acceleration data gathered from the accelerometer can be integrated to obtain the velocity relative to each axis (x, y, z); and integrated again to obtain the position of the client device 401 (in linear coordinates, x, y, and z). The angular velocity data from the gyroscope can be integrated to obtain the position of the client device 401 (in spherical coordinates). The programming for computing these useful values may be stored in on or more memory elements 540A, 540B, 540C and executed by the CPU 530 of the client device 401.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple IOS (for iPhone or iPad devices), Windows Mobile, Amazon Fire OS, RIM BlackBerry OS, or the like.

The memory 540 may additionally include, in some example implementations, an object control application 481, a localization system 482, and an image processing system 483, which are discussed above with reference to eyewear device 100. In a mobile device 401 in which cameras 570 are capturing frames of video data, the object control application 481 configures the CPU 530 to control the movement of an AR object 608 on a display in response to detecting one or more gestures on a user input layer of a display, for example. The localization system 482 configures the CPU 530 to obtain localization data for use in determining the position of the mobile device 401 relative to the physical environment. The localization data may be derived from a series of images, an IMU unit 572, a GPS unit, or a combination thereof. The image processing system 483 configures the CPU 530 to present a captured still image on a display in cooperation with the image display driver 582.

The processor 432 within the eyewear device 100 or the CPU 530 within the mobile device 401 may construct a map of the environment surrounding the respective eyewear device 100 or mobile device 401, determine a location of the eyewear device/mobile device within the mapped environment, and determine a relative position of the eyewear device/mobile device to one or more AR or physical objects in the mapped environment. The processor 432/530 may construct the map and determine location and position information using a simultaneous localization and mapping (SLAM) algorithm applied to data received from one or more sensors. Sensor data includes images received from one or both of the cameras 114A, 114B, 570, distance(s) received from a laser range finder, position information received from a GPS unit, motion and acceleration data received from an IMU 472/572, or a combination of data from such sensors, or from other sensors that provide data useful in determining positional information.

In the context of AR, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection. In one example, a system that includes a high-definition (HD) video camera that captures video at a high frame rate (e.g., thirty frames per second), the SLAM algorithm updates the map and the location of objects at least as frequently as the frame rate; in other words, calculating and updating the mapping and localization thirty times per second.

Sensor data includes image(s) received from one or both cameras 114A, 114B, 570 distance(s) received from a laser range finder, position information received from a GPS unit, motion and acceleration data received from an IMU 472/572, or a combination of data from such sensors, or from other sensors that provide data useful in determining positional information.

Figure 6A:
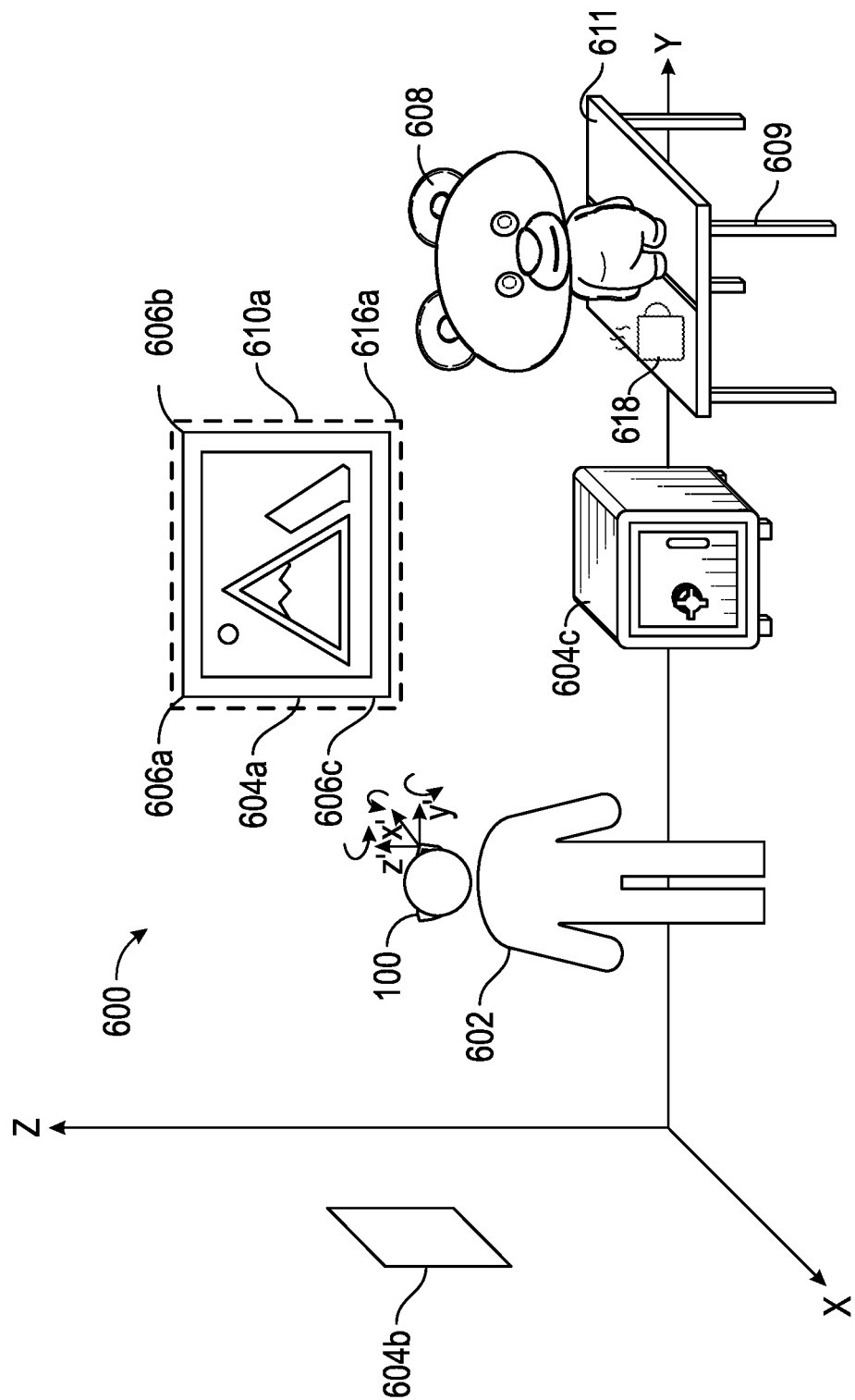
FIG. 6A is a schematic illustration of a user in an example environment including an AR primary object and a prop object for use in describing simultaneous localization and mapping with an eyewear device.

FIG. 6A depicts an example physical environment 600 along with elements that are useful when using a SLAM application and other types of tracking applications (e.g., natural feature tracking (NFT)) with an AR device such as the eyewear device 100. A user 602 of the eyewear device 100 is present in an example physical environment 600 (which, in FIG. 6A, is an interior room). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (roll, pitch, and yaw) of the eyewear device 100 within the environment by using two or more location points (e.g., three location points 606a, 606b, and 606c) associated with a single object 604a, or by using one or more location points 606 associated with two or more objects 604a, 604b, 604c. The processor 432 of the eyewear device 100 may position an AR object 608 (such as the bear shown in FIGS. 6A and 6B) within the environment 600 for viewing during an AR experience. The AR object 608 may be associated with a surface such as a top 611 of a table 609 with the environment 600, e.g., based on location coordinates.

The localization system 482 in some examples associates a virtual marker 610a with an AR object 608 in the environment 600. In AR, markers are registered at locations in the environment to assist devices with the task of tracking and updating the location of users, devices, and objects (virtual and physical) in a mapped environment. Markers are sometimes registered to a high-contrast physical object, such as the relatively dark object, such as the framed picture 604a, mounted on a lighter-colored wall, to assist cameras and other sensors with the task of detecting the marker. The markers may be preassigned or may be assigned by the eyewear device 100 upon entering the environment.

Markers can be encoded with or otherwise linked to information. A marker might include position information, a physical code (such as a bar code or a QR code; either visible to the user or hidden), or a combination thereof. A set of data associated with the marker is stored in the memory 434 of the eyewear device 100. The set of data includes information about the marker 610a, the marker's position (location and orientation), one or more virtual objects, or a combination thereof. The marker position may include three-dimensional coordinates for one or more marker landmarks 616a, such as the corner of the generally rectangular marker 610a shown in FIG. 6A and FIG. 6B. The marker location may be expressed relative to real-world geographic coordinates, a system of marker coordinates, a position of the eyewear device 100, or other coordinate system. The one or more virtual objects associated with the marker 610a may include any of a variety of material, including still images, video, audio, tactile feedback, executable applications, interactive user interfaces and experiences, and combinations or sequences of such material. Any type of content capable of being stored in a memory and retrieved when the marker 610a is encountered or associated with an assigned marker may be classified as a virtual object in this context. The AR object 608 (bear) shown in FIG. 6A, for example, is a virtual object displayed, either 2D or 3D, at a marker location.

In one example, the marker 610a may be registered in memory as being located near and associated with a physical object 604a (e.g., the framed work of art shown in FIG. 6A). In another example, the marker may be registered in memory as being a particular position with respect to the eyewear device 100.

Figure 6B:
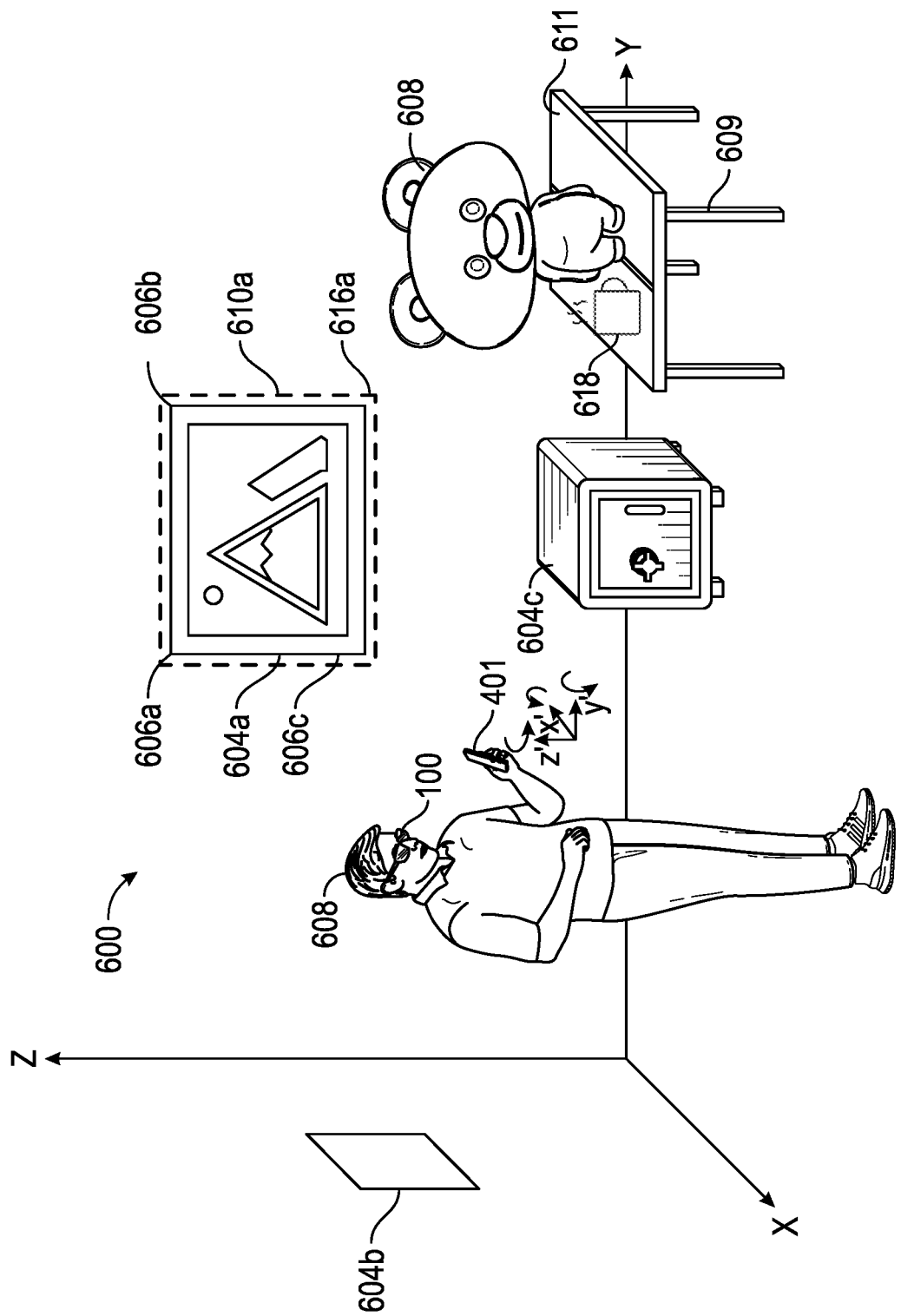
FIG. 6B is a schematic illustration of a user in an example environment including an AR primary object and a prop object for use in describing simultaneous localization and mapping with a mobile device.

FIG. 6B depicts another example physical environment 600 along with elements that are useful when using a SLAM application and other types of tracking applications (e.g., natural feature tracking (NFT)) with an AR device such as the mobile device 401. Similar to the processor 432 of the eyewear device 100, the CPU 530 of the mobile device 401 determines its position with respect to one or more objects 604 within the environment 600 using captured images, constructs a map of the environment 600 using a coordinate system (x, y, z) for the environment 600, and determines its position within the coordinate system. Additionally, the CPU 530 determines a pose (roll, pitch, and yaw) of the mobile device 401 within the environment by using two or more location points (e.g., three location points 606a, 606b, and 606c) associated with a single object 604a, or by using one or more location points 606 associated with two or more objects 604a, 604b, 604c. The CPU 530 of the mobile device 401 may position an AR object 608 (such as the bear shown in FIG. 6B) within the environment 600 for viewing during an AR experience.

FIGS. 6A and 6B additionally depict a prop object 618 (e.g., a secondary prop object such as the illustrated mug) with which the AR object 608 (e.g., an AR primary object) may interact. Each AR object 608 and prop object 618 is associated with AR logic that defines the characteristics of the particular object and how it will interact with other objects, e.g., for establishing logical connections.

In one example, the prop object 618 is a virtual/AR object similar to the AR object 608. In accordance with this example, the AR prop object is a predefined object in memory, an object selected from a previously captured image(s) or an image(s) of the environment 600, or an AR image drawn in the environment 600. If the AR prop object is predefined in memory, the AR prop object is associated with AR logic in the memory that the processor 432/530 accesses for use in developing AR overlays based on user input actions/instructions. If the AR prop object is not predefined in memory with associated AR logic, AR logic for the AR prop object may be selected from a set of predefined AR logic (e.g., manually or automatically). For manual selection, a user may select via a user input list from a drop down list of available AR logic. For automatic selection, the processor 432/530 may identify a category for the AR prop object by applying a computer vision algorithm to the image(s), select AR logic for the prop object 618 responsive to the identified category, and associate the selected AR logic with the prop object 618.

In another example, the prop object 618 is a physical object present in the environment. In accordance with this example, the processor 432/530 identifies the physical prop object 618. AR logic for the physical prop object may be selected from a set of predefined AR logic (e.g., manually or automatically). For manual selection, a user may select via a user input list from a drop down list of available AR logic. For automatic selection, the processor 432/530 may identify a category for the physical prop object by applying a computer vision algorithm to the image(s), select AR logic for the prop object 618 responsive to the identified category, and associate the selected AR logic with the prop object 618.

Figure 7A:
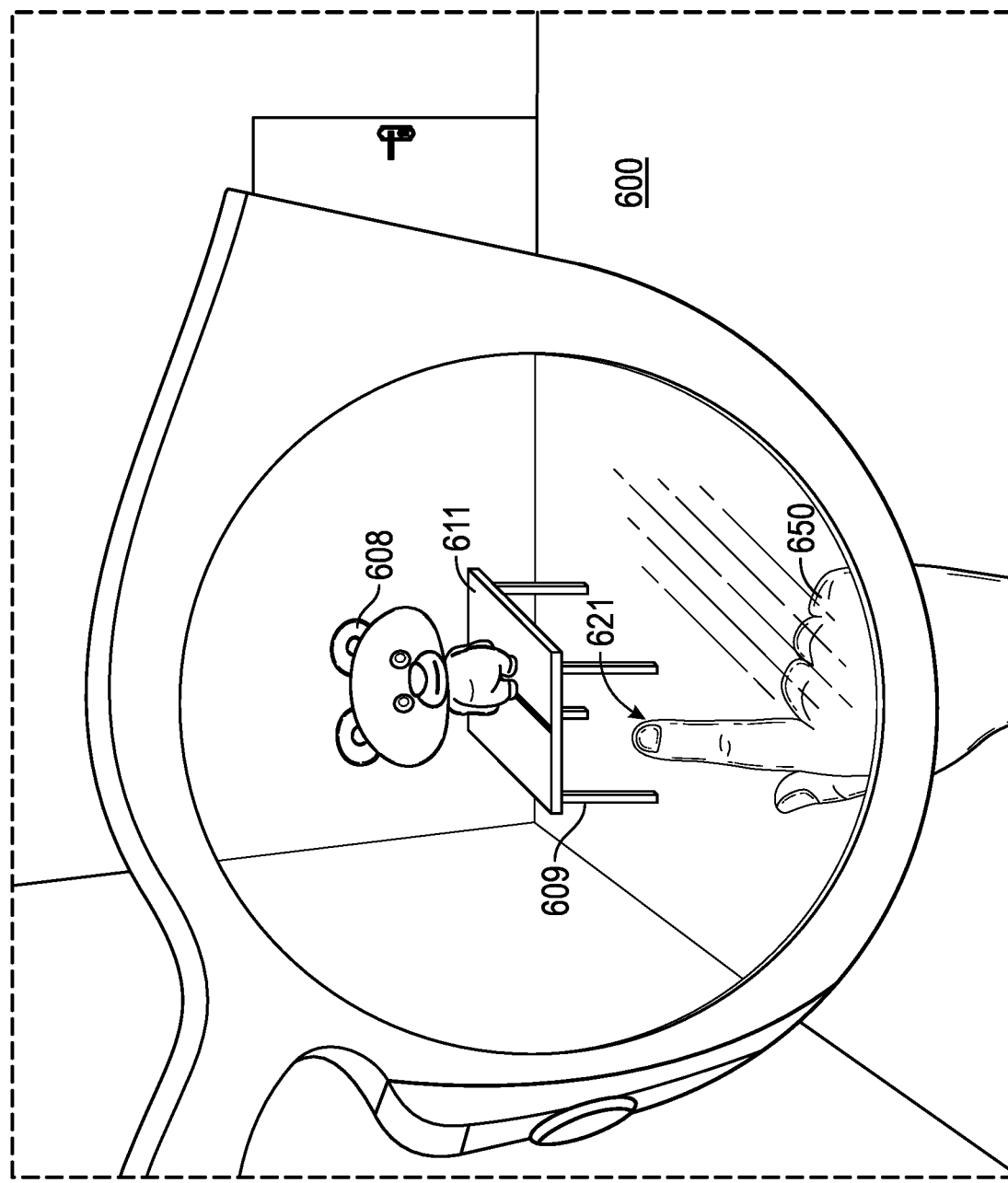
FIG. 7A is a perspective illustration of an example hand gesture controlling AR objects on a display of an eyewear device.

FIG. 7A is a perspective illustration of an example hand gesture controlling AR objects on an example display 180B. In this example, the eyewear device includes a semi-transparent image display 180B which, as described herein, may include a semi-transparent lens layer and a display matrix layer configured to present images on the lens of the eyewear device. The AR object 608 is presented as an overlay relative the physical environment 600. The effect, as shown, allows the viewer to see and interact with the AR object 608 while the surrounding environment 600 (including table 609) also remains visible through the display 180B. In this example, the AR object 608 is anchored to the physical environment 600 (i.e., on the tabletop), as opposed to appearing at a persistent location on the display 180B.

The hand 650 and hand shapes are detected and differentiated from other elements in the physical environment 600 as viewed through the semi-transparent display 180B and captured by the camera system 114. For example, a hand 650 with the index finger 621 extended may result in the virtual element 608 being moved to a position on a surface of a physical object where a vector extending from the index finger intersects the surface. In other examples, a first gesture or series of gestures such as swiping right/left/up/down with the index finger 621 extended may be interpreted to move through selection options and a second gesture or series of gestures such as a closed first may be interpreted as a final selection. The physical environment 600, of course, may be much more complex than the simple room shown. The camera system 114 typically has a camera field of view that captures images and video beyond the limits of the display 180B. In this aspect, the image processing system 483 detects hand shapes which may be located outside the view through the display 180B, but within the camera field of view.

Figure 7B:
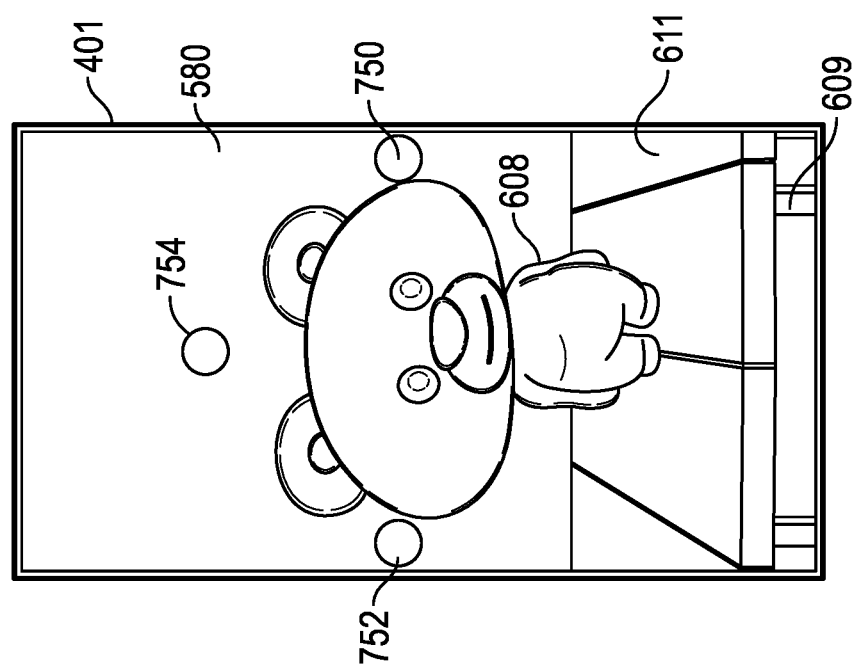
FIG. 7B is a perspective illustration of another example hand gesture controlling AR objects on a display of a mobile device.

FIG. 7B is a perspective illustration of an example control for controlling AR objects 608 on an example display 580. In this example, the mobile device 401 includes a display 580 having a user input layer 591 responsive to human touch. The AR object 608 is presented as an overlay relative the physical environment 600. The effect, as shown, allows the viewer to see and interact with the AR object 608 while the surrounding environment 600 also remains visible on the display 180B. In this example, the AR object 608 is anchored to the physical environment 600 (i.e., on the tabletop), as opposed to appearing at a persistent location on the display 180B.

A user may interact with the AR object 608 by pressing select areas on the user input layer 591. For example, dragging a finger on the user input layer above a surface (such as a tabletop) may result in the AR object 608 moving along the path made by the finger. In the illustrated example, selection areas are presented on the display 580 in areas of the user input layer 591 corresponding to particular actions. For example, pressing a right selection area 750 may cause a first action to occur (e.g., raise the bear's left arm), pressing a left selection area 752 may cause a second action to occur (e.g., raise the bear's right arm), and pressing a top selection area 754 may cause a third action to occur (e.g., the bear jumps). The physical environment 600, of course, may be much more complex than the simple room shown.

Figure 8:
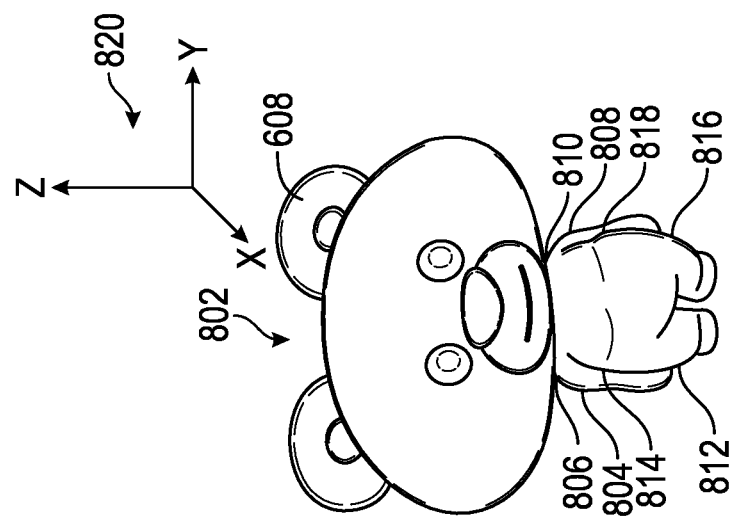
FIG. 8 is a front view of an example AR primary object (e.g., a bear in the illustrated example)
Figure 9A:
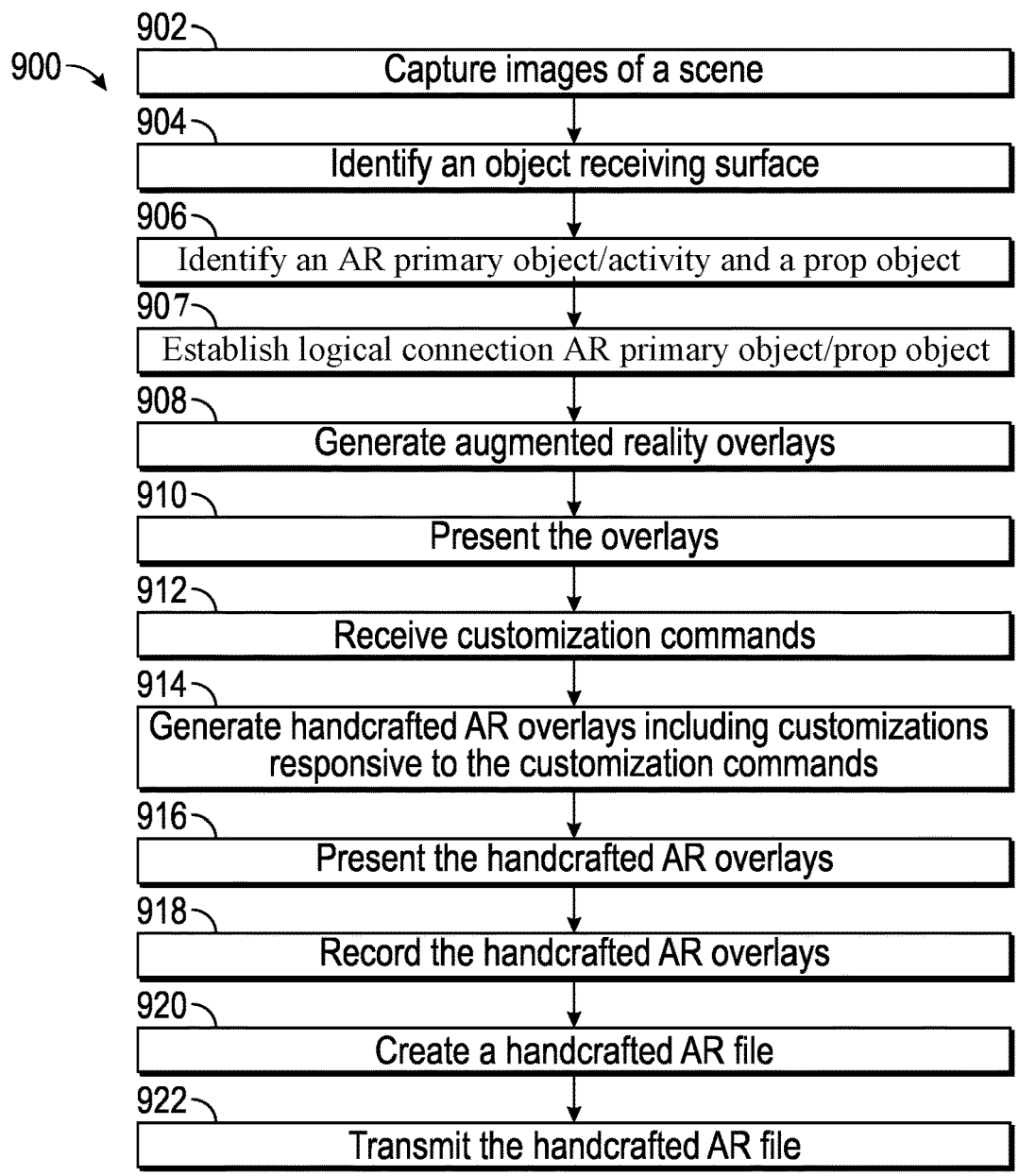
Figure 9B:
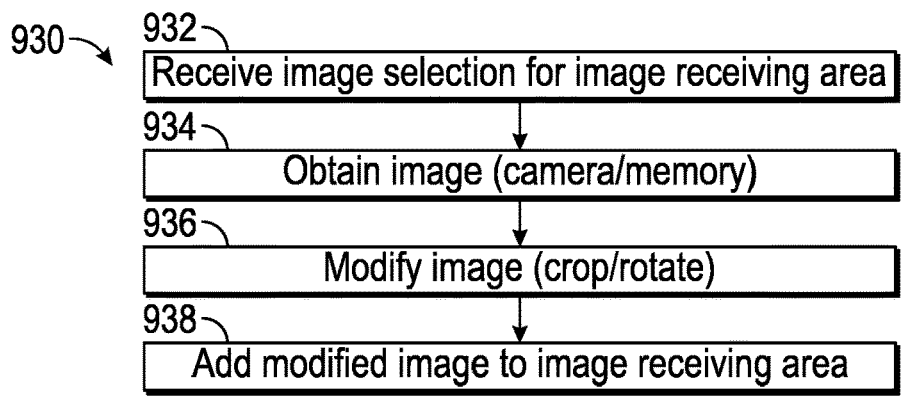

FIG. 8 depicts an example AR primary object 608 in the form of a bear. The primary object 608 has a head 802, a right arm 804, a right shoulder joint 806, a left arm 808, a left shoulder joint 810, a right leg 812, a right hip joint 814, a left leg 816, and a left hip joint 818. In an example, the AR primary object is associated with x-y-z coordinates 820 for defining the position of the AR primary object in the environment 600. The AR primary object may be associated with additional x-y-z coordinates that are assigned to different portions of the AR primary object (e.g., left arm 808) for use in positioning those portion s in the environment 600 in response to user actions. Likewise, each prop object 618 may be associated with one or more x-y-z coordinates defining corresponding positions of the prop object, e.g., for defining position the AR primary object and the prop object with respect to one another in accordance with a logical connection based on their respective AR logic.

Although a bear has been used throughout the examples as the AR primary object, essentially any 2D or 3D object may be selected as the AR primary object. For example, the AR primary object may be another predefined animal (e.g., a chicken), something the user selects from their environment (e.g., a coffee mug), something the user creates (e.g., using an AR paint application), or something received by the user from another user.

FIGS. 9A, 9B, 9C, and 9D are respective flow charts 900, 930, 940, and 950 depicting example methods of generating and sharing AR objects. Although the steps are described with reference to the eyewear device 100 and mobile device 401 described herein, other implementations of the steps described, for other types of devices, will be understood by one of skill in the art from the description herein. One or more of the steps shown and described may be performed simultaneously, in a series, in an order other than shown and described, or in conjunction with additional steps. Some steps may be omitted or, in some applications, repeated.

At block 902, capture images of a scene. A camera system (e.g., visible light camera 114A-B and image processor 412 of eyewear device or cameras 570 and an image processor of mobile device 401) capture images of the scene within a view of view of the system cameras. In one example, the camera system captures frames a video data. In some implementations, the high-speed processor 432 of the eyewear device 100 or CPU 530 of the mobile device 401 stores the captured frames of video data as the wearer/user moves through a physical environment 600.

The camera systems, in some implementations, include one or more high-resolution, digital cameras equipped with a CMOS image sensor capable of capturing high-definition still images and high-definition video at relatively high frame rates (e.g., thirty frames per second or more). Each frame of digital video includes depth information for a plurality of pixels in the image. In this aspect, the camera system serves as a high-definition scanner by capturing a detailed input image of the physical environment. The camera system, in some implementations, includes a pair of high-resolution digital cameras spaced apart to acquire a left-camera raw image and a right-camera raw image. When combined, the raw images form an input image that includes a matrix of three-dimensional pixel locations.

At block 904, identify an object receiving surface. A processing system including a processor (e.g., HS processor 432 or CPU 530) identifies an object receiving surface with an environment. In one example, the processing system identifies a flat horizontal surface of a predefined size (e.g., greater than 1 foot by 1 foot) closest to a central point of the field of view as the object receiving surface. Coordinates corresponding to the identified object receiving surface are recorded for use in positioning objects with respect to the object receiving surface.

Processing system identifies the flat horizontal surfaces by applying machine vision techniques to the captured images (Block 902). Although the object receiving surface is described in the examples herein as a flat horizontal surface of a predefined size, the object receiving surface can be essentially any surface desired by a designer or user for placing the AR primary object (e.g., a flat vertical surface, a ceiling, a floor, etc.).

At block 906, identify an AR primary object/activity and a prop object. In one example, a user selects the AR primary object/activity from predefined AR primary objects/activities via a user input system (e.g., hand gestures captured and processed by eyewear device 401 or user layer 591 of mobile device 401). In other example, the AR primary object/activity may be generated by the user. For example, the user may capture an image of an object (e.g., a coffee mug given to her by a friend) and designate that object as an AR primary object or may draw an object (e.g., via an AR paint application) and designate the drawn object as the AR primary object. An AR prop object may be associated with the AR primary object in which case selection of the AR prop object results in the simultaneous selection of an AR prop object.

Similarly, in one example for an AR prop object, a user selects the prop object from predefined prop objects via a user input system (e.g., hand gestures captured and processed by eyewear device 401 or user layer 591 of mobile device 401). In another example, the AR primary object/activity may be generated by the user. For example, the user may capture an image of an object (e.g., a coffee mug given to her by a friend) and designate that object as an AR primary object or may draw an object (e.g., via an AR paint application) and designate the drawn object as the AR primary object.

In one example for a physical prop object, a user selects the prop object by selecting it within an environment 600 via a user input system (e.g., hand gestures adjacent the desired prop object captured and processed by eyewear device 401 or user layer 591 of mobile device 401).

Figure 10C:
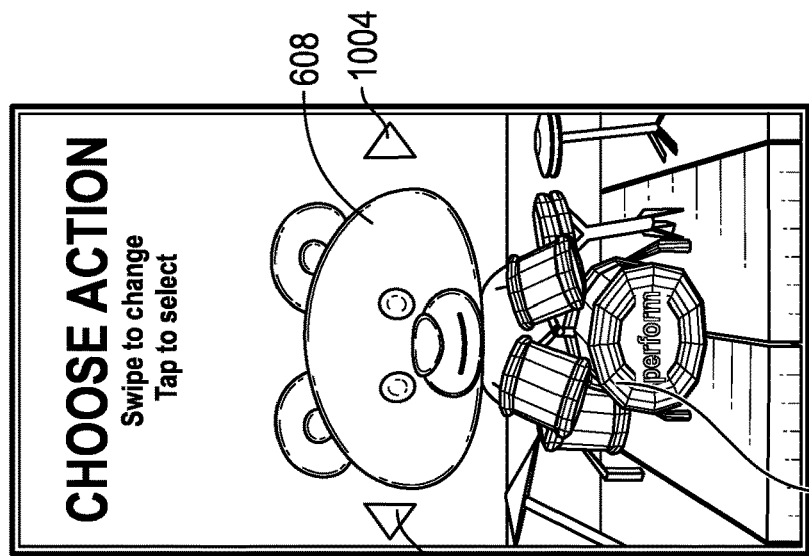
FIGS. 10A, 10B, and 10C are perspective views of a display including example actions for an AR primary object.
Figure 10B:
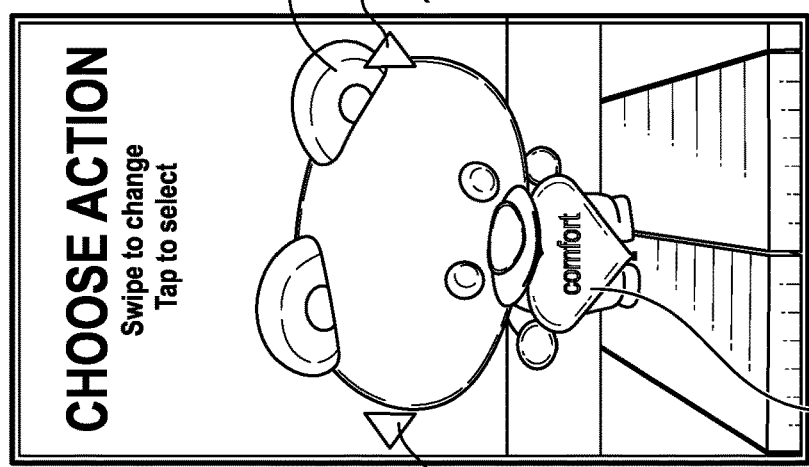
Figure 10A:
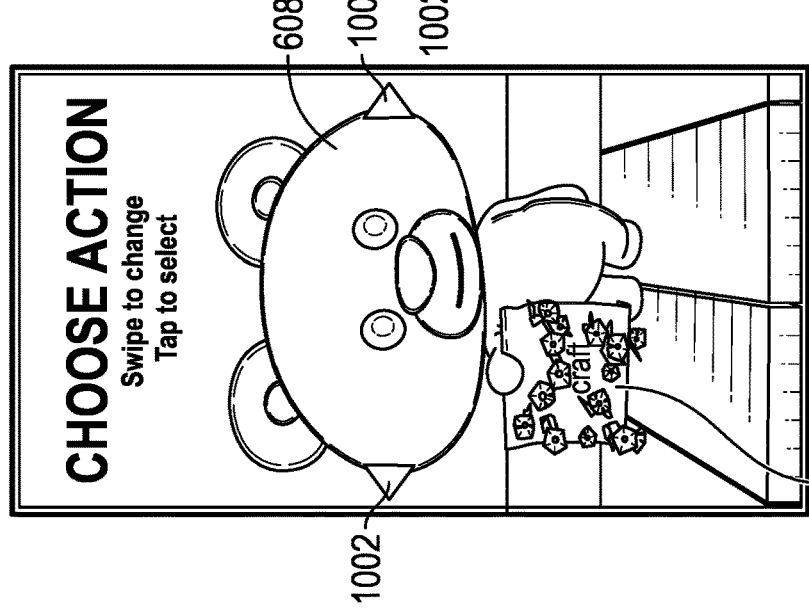

The AR primary object is associated with at least one set of primary object coordinates for use in positioning the AR primary object in the environment 600 and the AR object is associated with at least one set of prop object coordinates for use in positioning the prop object in the environment 600 and with respect to the AR primary object. The coordinates of the objects may be set with respect to the coordinates of the center of the object receiving surface. The user may be presented with the predefined AR primary objects/activities on a display of the AR device. FIGS. 10A-10C depicts example predefined AR primary objects/activities for presentation on a display of a mobile device 401, FIG. 11B depicts a primary object in the form of a bear and a prop object in the form of another bear, and FIG. 10C depicts a primary object in the form of a bear and a prop object in the form of a drum set. Suitable modifications for presenting on displays of an eyewear device 100 will be understood by one of skill in the art from the description herein.

FIG. 10A depicts a bear AR primary object 608 associated with a craft activity 1010, FIG. 10B depicts the bear AR primary object 608 associated with a comfort activity 1012, and FIG. 10C depicts the bear AR primary object 608 associated with a perform activity 1014. A user may swipe left or tap left arrow 1002 to move to a prior AR primary object/activity and may swipe right or tap right arrow 1004 to move to the next prior AR primary object/activity. The user may tap the center of the display or use a predefined hand gesture to select the AR primary objects/activities.

At block 907, establish a logical connection between the AR primary object and the prop object. The logical connection establishes how the AR primary object and the prop object interact with one another responsive to actions/commands received via the user input system. For example, where the AR primary object 608 is a bear and the prop object is an AR drum set 1014 (see FIG. 11C) the logical connection establishes relative movement of the bears arm and action of the snare drum in response to a user selecting a snare indicator 1108B presented on a user input layer 591 of a display 580 (FIG. 5).

At block 908, generate AR overlays. In one example, an image processing system (e.g., image processor 412 of eyewear device 100 or CPU 530 of mobile device 401) generates the AR overlays. The AR overlays include the identified AR primary object positioned within the environment 600 adjacent (e.g., on) the object receiving surface. The image processing system positions the AR primary object with respect to the object receiving surface responsive to their respective coordinates. Additionally, the image processing system positions the AR primary object and the AR/physical secondary prop object with respect to one another in accordance with the logical connection. In one example, the logical connection is a mirrored connection between the AR primary object and the AR prop object (e.g., the prop object moves responsive to movement of the AR primary object).

At block 910, present the AR overlays. A display system (e.g., image display driver 442 and displays 180 of the eyewear device 100 or driver 582 and display 580 of the mobile device 401) presents the AR overlays under control of the processing system. The display system has a viewing area corresponding to the field of view of the camera system. In one example, the viewing area is the same size as the field of view. In another example, the viewing area is smaller than the field of view.

At block 912, receive customization commands. In one example, a user selects from predefined customization commands via a user input system. The customization commands may be solicited through predefined selectable actions associated with each of the AR primary objects/ activities. In accordance with this example, the user is presented with the predefined selectable actions on a display of the AR device. FIGS. 11A-11C, 12A and 12B depict example predefined selectable actions for presentation on a display of a mobile device 401. After completing a selectable action, the user has the option to send the AR primary object as customize by selecting send 1101B or to save (e.g., to send later or to add other selectable actions) by selecting save 1101A. Suitable modifications for presenting on displays of an eyewear device 100 will be understood by one of skill in the art from the description herein. Whether corresponding sounds are presented is controlled by actuation noise selection 1101C.

Figure 11A:
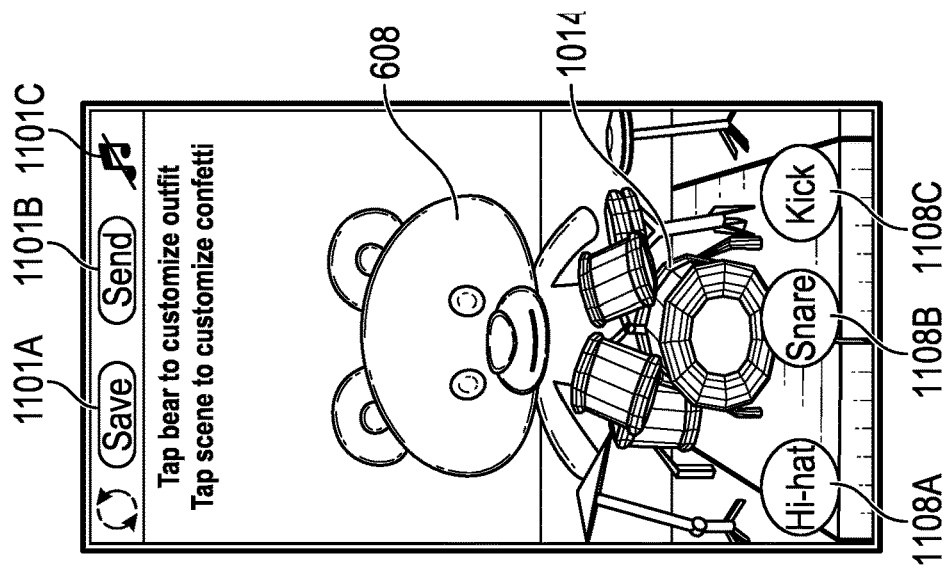
FIG. 11A is a perspective views of a display including an example action for an AR primary object.
Figure 11B:
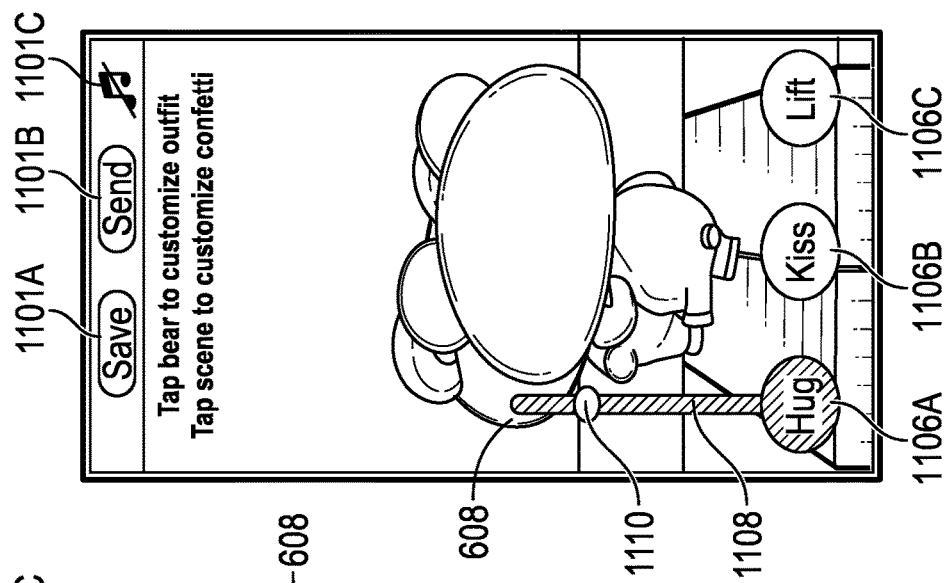
FIGS. 11B and 11C are perspective views of a display including example interaction for an AR primary object with a prop object.

FIG. 11A depicts predefined customization commands for a craft activity 1010 (FIG. 10A). In one example, the AR primary object includes an image receiving area 1102. An outline of the image receive area 1102 may be visible as shown or not visible. The predefined customization commands include draw 1104A, media 1104B, and voice 1104C. Selection of draw 1104A results in display of a sketch pad that the user can "draw" on using their finger or an electronic pen compatible with the device. Upon completion of the drawing, the drawing is added to the image receiving area or another area that is predefined or defined by the user. Selection of media 1104B results in the user being able to select a camera (e.g., to capture images in the environment 600) or from stored media (e.g., from the camera roll). Upon selection of the desired media, the media is added to the image receiving area or another area that is predefined or defined by the user. Selection of voice 1104C results in the user being able to select a microphone (e.g., to capture a spoken message) or from stored media (e.g., from a song list). Upon selection of the desired media, the media is added to a file associated with the AR primary object. Flow chart 930 (FIG. 9B) depicts example steps for adding an image using processing system. At block 932, receive an image selection for the image selection area. At block 934 obtain an image from a camera or from memory. At block 936, optionally modify the image (e.g., by cropping or rotating). At block 928, apply the image (as optionally modified) to the image receiving area.

FIG. 11B depicts predefined customization commands for a comfort activity 1012 (FIG. 10B). In one example, the AR primary object is paired with a prop object. The prop object may be another virtual object or a physical object in the environment designated by the user. The positioning of the AR primary object with respect to the prop object is managed (e.g., by the processing system) through their respective coordinates.

The predefined customization commands include hug 1106A, kiss 1106B, and lift 1106C. Selection of hug 1106A results in display of the AR primary object 608 embracing the prop object. The hug selection 1106A may include a sliding scale 1108 with an indicator 1110 on the sliding scale 1108 representing an intensity of the hug (e.g., the closer the respective coordinates of the AR primary object and the prop object). Selection of kiss 1106B results in display of the AR primary object 608 kissing the prop object. Selection of lift 1106C results in display of the AR primary object 608 lifting the prop object (and optionally twirling). Flow chart 940 (FIG. 9C) depicts example steps for performing an action (optionally with a prop). At block 942, receive an action selection for AR primary object. At block 944, identify a prop (physical or virtual). At block 946, adjust the AR primary object responsive to the action selection and optional prop.

Figure 11C:
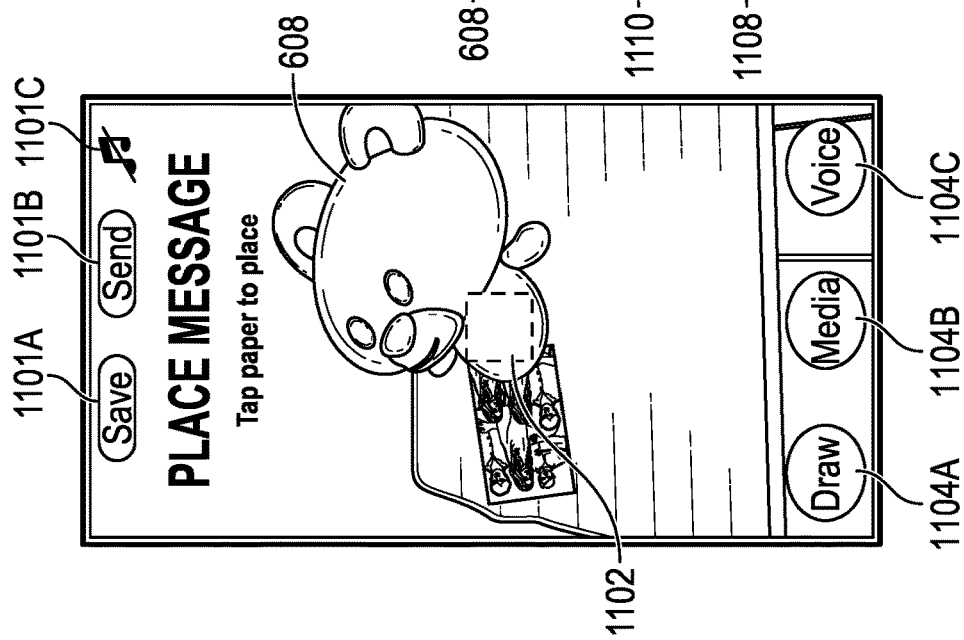

FIG. 11C depicts predefined customization commands for a performance activity 1014 (FIG. 10C). In one example, the AR primary object is paired with an activity prop object (e.g., a drum set for drumming. The activity prop object is another virtual object. The predefined customization commands for a drum set prop include hi-hat 1108A, snare 1108B, and kick 1108C. Selection of the hi-hat 1108A results in display of the AR primary object 608 hitting the hi hat of the drum set and presentation of a corresponding noise via speakers. Selection of the snare 1108B results in display of the AR primary object 608 hitting the snare of the drum set and presentation of a corresponding noise. Selection of kick 1108C results in display of the AR primary object 608 actuating the base drum and presentation of a corresponding noise.

Figures 12A, 12B:
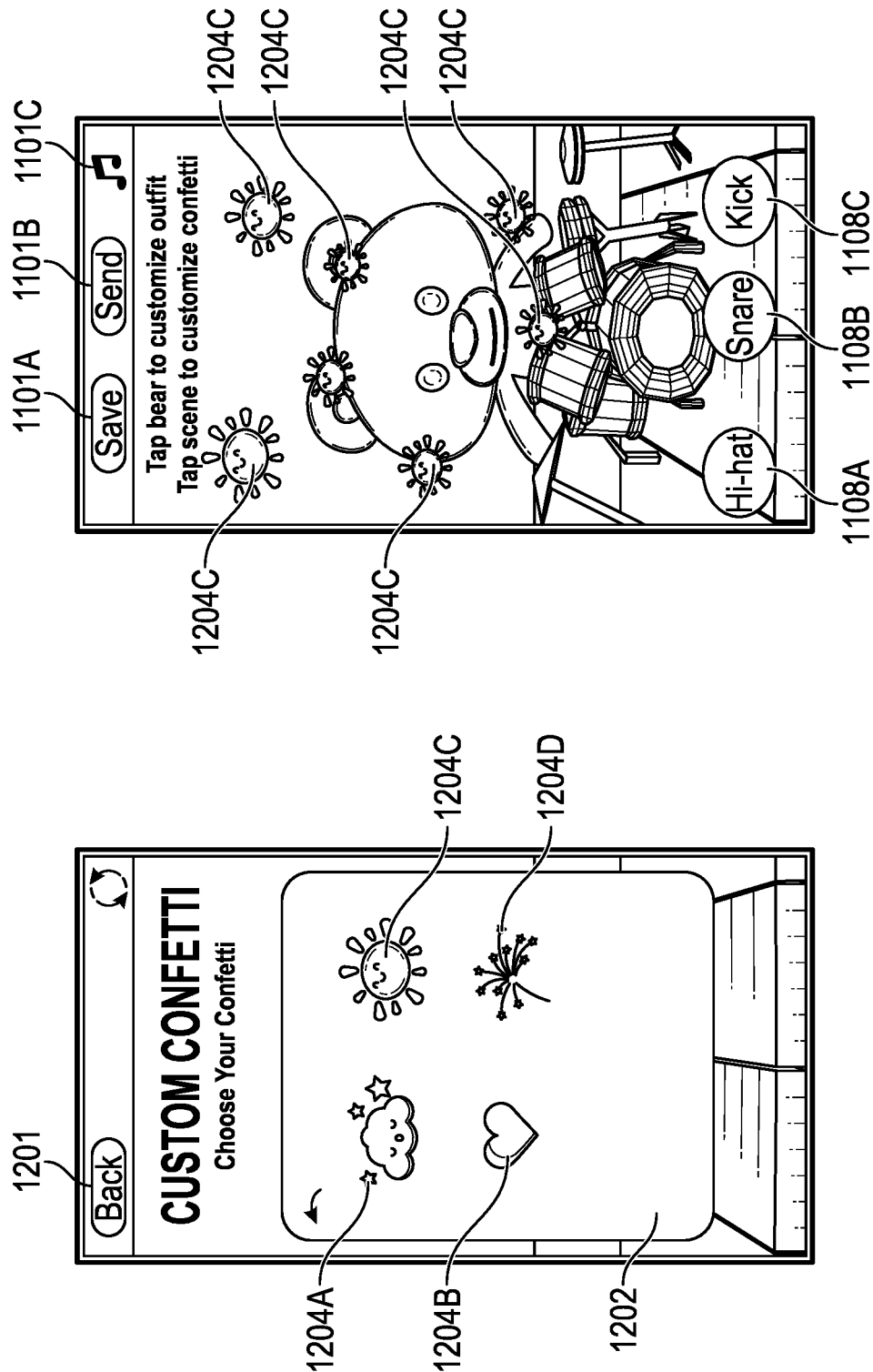
FIGS. 12A and 12B are perspective views of a display including example graphical user interfaces (GUIs) for customizing the AR primary object, an outfit, or a scene.

The activities can be further customized using the features depicted in FIGS. 12A and 12B. FIG. 12A depicts predefined confetti options 1204A, B, C, and D depicted in a selection area 1202. The confetti options can be accessed by tapping the scene on a display of a mobile device. Once a confetti option is selected, it is positioned in the scene corresponding to where the screen was tapped. For example, as illustrated in FIG. 12B for the drum set performance activity, the user taps on the screen, which presents the custom confetti options. Selection of a particular confetti (e.g., sun 1204C) results in that confetti being positioned on the screen in the area where the user tapped. The user may return to the activity without adding confetti by tapping back 1201.

At block 914, generate AR overlays including customizations responsive to the customization commands. In one example, an image processing system (e.g., image processor 412 of eyewear device 100 or CPU 530 of mobile device 401) generates the AR overlays. The AR overlays include the identified AR primary object with applied customizations (including applicable prop objects) positioned within the environment 600 adjacent (e.g., on) the object receiving surface. In one example, the image processing system positions the AR primary object with respect to the object receiving surface responsive to their respective coordinates and positions the AR prop object with respect to the AR primary object responsive to their respective coordinates and the logical connection there between.

At block 916, present the AR overlays. A display system (e.g., image display driver 442 and displays 180 of the eyewear device 100 or driver 582 and display 580 of the mobile device 401) presents the AR overlay under control of the processing system.

At block 918, record the AR overlays. The processing system records the AR overlays in memory (e.g., memory 434 of eyewear device 100 or memory 540 of mobile device 401).

At block 920, generate an AR file. The processing system combines the AR overlays into a file for transmission to another augmented reality device and playback thereon. Suitable file formats include a 3D file format such as USDZ, FBX, etc.

At block 922, transmit the AR file. The processing system transmits the file via a wired or wireless connection via a transceiver for reception by a transceiver of another device.

The other device, upon receipt of the AR file, captures, via another camera system, images of the another scene in the field of view of the other device (e.g., as described with reference to block 902), identifies another object receiving surface and corresponding surface coordinates within the other scene (e.g., as described with reference to block 904), generates AR overlays from the AR file including the customizations associated with the AR primary object for positioning adjacent the other object receiving surface responsive to the primary object coordinates and the surface coordinates within the other scene (e.g., as described with reference to block 914), and presents, via another display system, the AR overlays (e.g., as described with reference to block 916).

Flowchart 950 depicts example steps for adding a soundtrack to the AR file. At block 952, receive an audio personalization selection. The processor system may receive an audio personalization selection via selection of a selection option presented on a display. At block 954, the processor system presents audio options on a display. At decision block 956, the processor determines whether a live recording is selected. If a live recording is selected, at block 958, live audio is recorded via a microphone and stored in memory as a soundtrack. At block 960, present prerecorded soundtrack selection option (e.g., retrieved from memory). At block 962, receive a soundtrack selection from the presented options and identify as the soundtrack. At block 964, optionally receive soundtrack adjustment (e.g., select only the chorus from a song. At block 966, the soundtrack (as optionally adjusted) is added to the AR file for playback along with the visual aspects of the AR overlays.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An augmented reality (AR) device for generating an AR experience, the AR device comprising:

a camera system configured to capture images of a scene within a field of view;
a display system configured to present AR overlays on a display, the display having a viewing area corresponding to the camera system field of view;
a user input system configured to receive input from a user, wherein the input includes hand gestures captured by the camera system; and
a processor coupled to the camera system, the display system, and the user input system, the processor configured to:
 capture, via the camera system, images of the scene;
 identify an object receiving surface and corresponding surface coordinates within the scene;
 identify, responsive to the input received from the user via the user input system, including the hand gestures captured by the camera system, an AR primary object and a prop object, wherein the AR primary object is associated with at least one set of primary object coordinates and one of the AR primary object or the prop object is identified by the user capturing an image of a physical object with the camera system and designating, according and in response to the input received from the user, the physical object captured in the image as the one of the AR primary object or the prop object;
 establish a logical connection between the AR primary object and the prop object;
 generate AR overlays including actions associated with the AR primary object responsive to commands received from the user via the user input system that position the AR primary object adjacent the object receiving surface responsive to the primary object coordinates and the surface coordinates within the scene and that position the AR primary object and the prop object with respect to one another in accordance with the logical connection; and
 present, via the display system, the generated AR overlays;
 wherein the prop object is a physical object within the scene and wherein to identify the physical object the processor is configured to receive a selection of the physical object via the user input system; and
 wherein the processor is further configured to:
  identify a category for the selected physical object; and
  select logic for the physical object responsive to the identified category, the selected logic specifying predefined interactions between the AR primary object and the physical object;
 wherein the established logical connection is based on the selected logic and the generated AR overlays are responsive to commands received via the user input system.

2. The AR device of claim 1, wherein the processor is further configured to:
record the AR overlays;
generate an AR file including the recorded overlays; and transmit the AR file.

3. The AR device of claim 1, wherein the predefined interactions include a movement of the AR primary object to present an appearance of the AR primary object manipulating the prop object.

4. An augmented reality (AR) device for generating an AR experience, the AR device comprising:
a camera system configured to capture images of a scene within a field of view;
a display system configured to present AR overlays on a display, the display having a viewing area corresponding to the camera system field of view;
a user input system configured to receive input from a user, wherein the input includes hand gestures captured by the camera system; and
a processor coupled to the camera system, the display system, and the user input system, the processor configured to:
 capture, via the camera system, images of the scene;
 identify an object receiving surface and corresponding surface coordinates within the scene;
 identify, responsive to the input received from the user via the user input system, including the hand gestures captured by the camera system, an AR primary object and a prop object, wherein the AR primary object is associated with at least one set of primary object coordinates and one of the AR primary object or the prop object is identified by the user capturing an image of a physical object with the camera system and designating, according and in response to the input received from the user, the physical object captured in the image as the one of the AR primary object or the prop object;
 establish a logical connection between the AR primary object and the prop object;
 generate AR overlays including actions associated with the AR primary object responsive to commands received from the user via the user input system that position the AR primary object adjacent the object receiving surface responsive to the primary object coordinates and the surface coordinates within the scene and that position the AR primary object and the prop object with respect to one another in accordance with the logical connection;
 present, via the display system, the generated AR overlays,
 wherein the prop object is an AR secondary object and wherein to identify the AR secondary object the processor is configured to receive input via the user input system and generate the AR secondary object responsive to the user input, and
 wherein the processor is further configured to:
  identify a category for the generated AR secondary object; and
  select logic for the generated AR secondary object responsive to the identified category, the selected logic specifying predefined interactions between the AR primary object and the generated AR secondary object;
 wherein the established logical connection is based on the selected logic and the generated AR overlays are responsive to commands received via the user input system.

5. The AR device of claim 4, wherein the processor is further configured to:
record the AR overlays;
generate an AR file including the recorded overlays; and transmit the AR file.

6. An augmented reality (AR) method for generating an AR experience, the method comprising:
capturing, via a camera system, images of a scene;
identifying an object receiving surface and corresponding surface coordinates within the scene;
identifying, responsive to input received from a user via a user input system including hand gestures captured by the camera system, an AR primary object and a prop object, wherein the AR primary object is associated with at least one set of primary object coordinates and one of the AR primary object or the prop object is identified by the user capturing an image of a physical object with the camera system and designating, according and in response to the input received from the user, the physical object captured in the image as the one of the AR primary object or the prop object;

establishing a logical connection between the AR primary object and the prop object;

generating AR overlays including actions associated with the AR primary object responsive to commands received from the user via the user input system that position the AR primary object adjacent the object receiving surface responsive to the primary object coordinates and the surface coordinates within the scene and that position the AR primary object and the prop object with respect to one another in accordance with the logical connection; and presenting, via a display system, the generated AR overlays;

wherein the prop object is a physical object within the scene and wherein identifying the physical object comprises receiving a selection of the physical object via the user input system; and the method further comprises:
identifying a category for the selected physical object; and
selecting logic for the physical object responsive to the identified category, the selected logic specifying predefined interactions between the AR primary object and the physical object;
wherein the established logical connection is based on the selected logic and the generated AR overlays are responsive to commands received via the user input system.

7. The method of claim 6, further comprising:
recording the AR overlays;
generating an AR file including the recorded overlays; and
transmitting the AR file.

8. The method of claim 6, wherein the predefined interactions include a movement of the AR primary object to present an appearance of the AR primary object manipulating the AR secondary object.

9. An augmented reality (AR) method for generating an AR experience, the method comprising:
capturing, via a camera system, images of a scene;
identifying an object receiving surface and corresponding surface coordinates within the scene;
identifying, responsive to input received from a user via a user input system including hand gestures captured by the camera system, an AR primary object and a prop object, wherein the AR primary object is associated with at least one set of primary object coordinates and one of the AR primary object or the prop object is identified by the user capturing an image of a physical object with the camera system and designating, according and in response to the input received from the user, the physical object captured in the image as the one of the AR primary object or the prop object;
establishing a logical connection between the AR primary object and the prop object;
generating AR overlays including actions associated with the AR primary object responsive to commands received from the user via the user input system that position the AR primary object adjacent the object receiving surface responsive to the primary object coordinates and the surface coordinates within the scene and that position the AR primary object and the prop object with respect to one another in accordance with the logical connection;
presenting, via a display system, the generated AR overlays;
wherein the prop object is an AR secondary object and wherein identifying the AR secondary object comprises receiving input via the user input system and generating the AR secondary object responsive to the user input; and
the method further comprises:
identifying a category for the generated AR secondary object; and
selecting logic for the generated AR secondary object responsive to the identified category, the selected logic specifying predefined interactions between the AR primary object and the generated AR secondary object;
wherein the established logical connection is based on the selected logic and the generated AR overlays are responsive to commands received via the user input system.

10. The method of claim 9, further comprising:
recording the AR overlays;
generating an AR file including the recorded overlays; and
transmitting the AR file.

11. A non-transitory computer-readable medium storing program code including instructions that, when executed, are operative to cause an electronic processor to perform the steps of:
capturing, via a camera system, images of a scene;
identifying an object receiving surface and corresponding surface coordinates within the scene;
identifying, responsive to input received from a user via a user input system including hand gestures captured by the camera system, an AR primary object and a prop object, wherein the AR primary object is associated with at least one set of primary object coordinates and one of the AR primary object or the prop object is identified by the user capturing an image of a physical object with the camera system and designating, according and in response to the input received from the user, the physical object captured in the image as the one of the AR primary object or the prop object;
establishing a logical connection between the AR primary object and the prop object;
generating AR overlays including actions associated with the AR primary object responsive to commands received from the user via the user input system that position the AR primary object adjacent the object receiving surface responsive to the primary object coordinates and the surface coordinates within the scene and that position the AR primary object and the prop object with respect to one another in accordance with the logical connection; and
presenting, via a display system, the generated AR overlays;
wherein the prop object is a physical object within the scene and wherein identifying the physical object comprises receiving a selection of the physical object via the user input system; and
wherein the instructions, when executed, are operative to cause the electronic processor to perform the additional steps of:
identifying a category for the selected physical object; and selecting logic for the physical object responsive to the identified category, the selected logic specifying predefined interactions between the AR primary object and the physical object;

wherein the established logical connection is based on the selected logic and the generated AR overlays are responsive to commands received via the user input system.

12. A non-transitory computer-readable medium storing program code including instructions that, when executed, are operative to cause an electronic processor to perform the steps of:

capturing, via a camera system, images of a scene;

identifying an object receiving surface and corresponding surface coordinates within the scene;

identifying, responsive to input received from a user via a user input system including hand gestures captured by the camera system, an AR primary object and a prop object, wherein the AR primary object is associated with at least one set of primary object coordinates and one of the AR primary object or the prop object is identified by the user capturing an image of a physical object with the camera system and designating, according and in response to the input received from the user, the physical object captured in the image as the one of the AR primary object or the prop object;

establishing a logical connection between the AR primary object and the prop object;

generating AR overlays including actions associated with the AR primary object responsive to commands received from the user via the user input system that position the AR primary object adjacent the object receiving surface responsive to the primary object coordinates and the surface coordinates within the scene and that position the AR primary object and the prop object with respect to one another in accordance with the logical connection; and presenting, via a display system, the generated AR overlays;

wherein the prop object is an AR secondary object and wherein identifying the AR secondary object comprises receiving input via the user input system and generating the AR secondary object responsive to the user input;

wherein the instructions, when executed, are operative to cause the electronic processor to perform the additional steps of:

identifying a category for the generated AR secondary object; and selecting logic for the generated AR secondary object responsive to the identified category, the selected logic specifying predefined interactions between the AR primary object and the generated AR secondary object, wherein the established logical connection is based on the selected logic and the generated AR overlays are responsive to commands received via the user input system.

* * * * *